US007584431B2

United States Patent
Kazushige et al.

(10) Patent No.: US 7,584,431 B2
(45) Date of Patent: Sep. 1, 2009

(54) COMMUNICATION SYSTEM AND TERMINAL UNITS CONNECTED THERETO

(75) Inventors: Hiroi Kazushige, Machida (JP); Nobukazu Kondo, Ebina (JP); Tsutomu Hara, Yokohama (JP); Tooru Yokozawa, Yokohama (JP); Kazuchika Ogiwara, Fujisawa (JP); Masaya Umemura, Yokosuka (JP); Shinichiro Okamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 634 days.

(21) Appl. No.: 10/724,778

(22) Filed: Dec. 2, 2003

(65) Prior Publication Data

US 2004/0139052 A1     Jul. 15, 2004

(30) Foreign Application Priority Data

Jan. 14, 2003   (JP)   ............................. 2003-005618

(51) Int. Cl.
*G06F 3/00* (2006.01)
(52) U.S. Cl. .................................................... 715/751
(58) Field of Classification Search ................ 715/751, 715/752, 753, 755, 758
See application file for complete search history.

(56) References Cited

U.S. PATENT DOCUMENTS 6,047,288 A * 4/2000 Kurosawa et al. ............. 707/9
6,437,758 B1 * 8/2002 Nielsen et al. ................. 345/8
6,466,250 B1 * 10/2002 Hein et al. ................ 348/14.16
6,542,165 B1 * 4/2003 Ohkado ....................... 715/751
6,624,827 B1 * 9/2003 Hwang et al. ............... 715/753
7,185,054 B1 * 2/2007 Ludwig et al. .............. 709/204
2003/0208534 A1 * 11/2003 Carmichael ................. 709/203

FOREIGN PATENT DOCUMENTS

| JP | 05063874 | 3/1993 |
|---|---|---|
| JP | 05081592 | 4/1993 |
| JP | 05327973 | 12/1993 |
| JP | 06284241 | 10/1994 |
| JP | 08130514 | 5/1996 |
| JP | 10079823 | 3/1998 |
| JP | 2002330244 | 11/2002 |

* cited by examiner

*Primary Examiner*—Thanh T Vu
(74) *Attorney, Agent, or Firm*—Brundidge & Stanger, P.C.

(57) ABSTRACT

A communication system including a network and at least two terminal units connected thereto. Each terminal unit includes a session controlling unit for controlling a session for enabling transmission/receiving of voice, image, handwritten data to/from the remote terminal unit individually, and a display unit for displaying the image and the handwritten data. The image data and the handwritten data are overlapped and displayed on a display of the display unit.

9 Claims, 24 Drawing Sheets

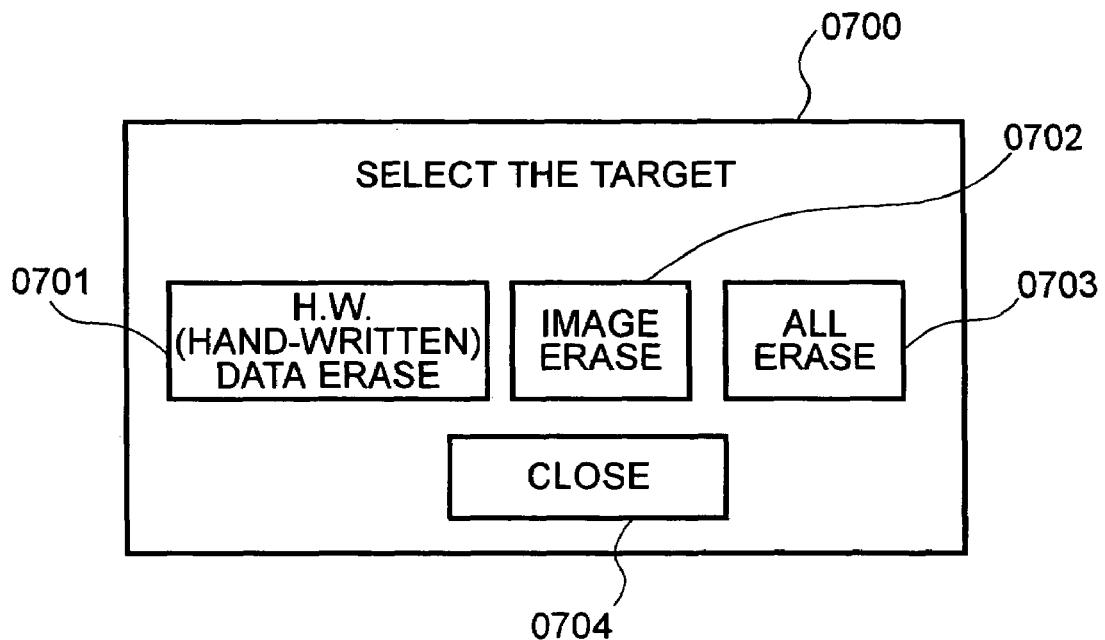
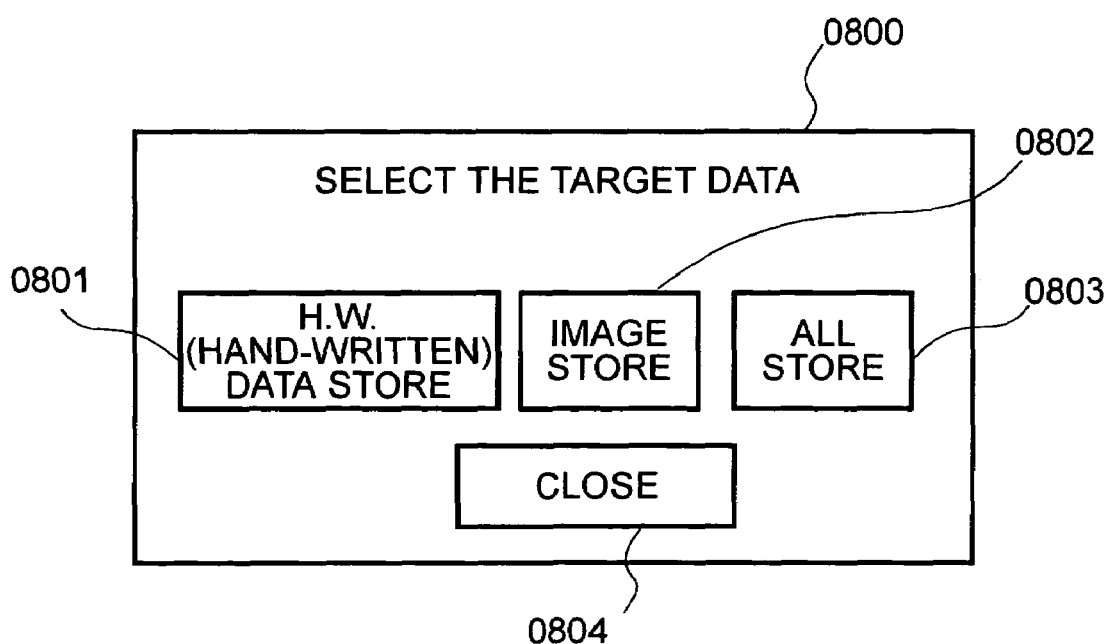

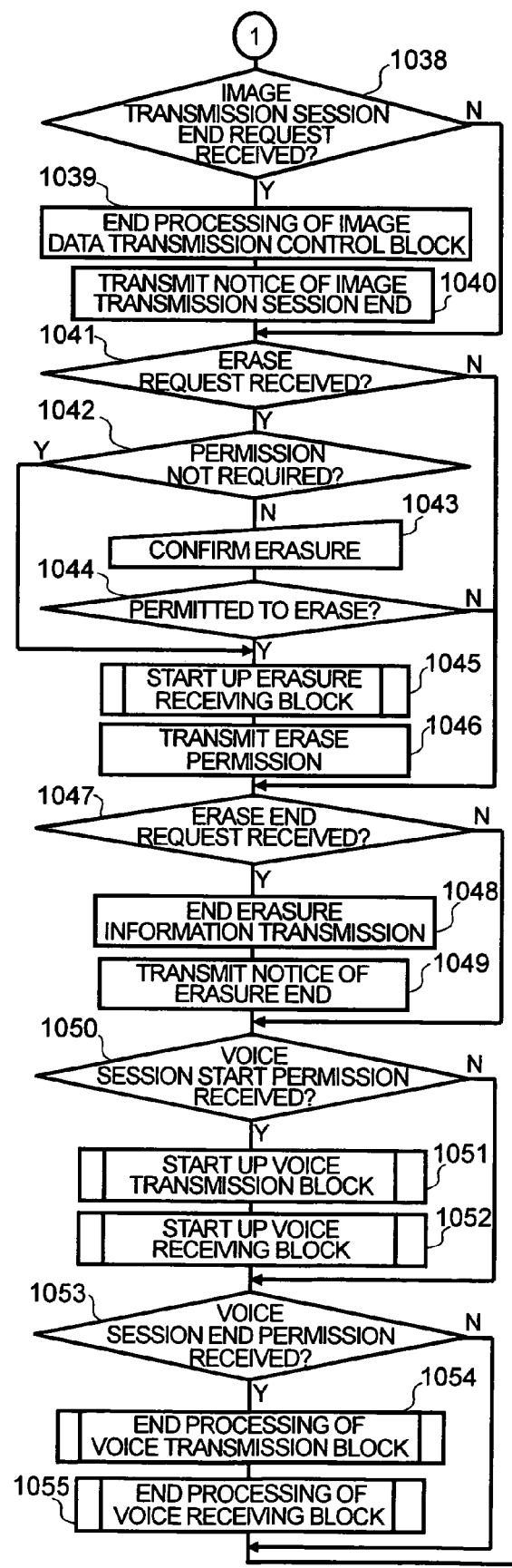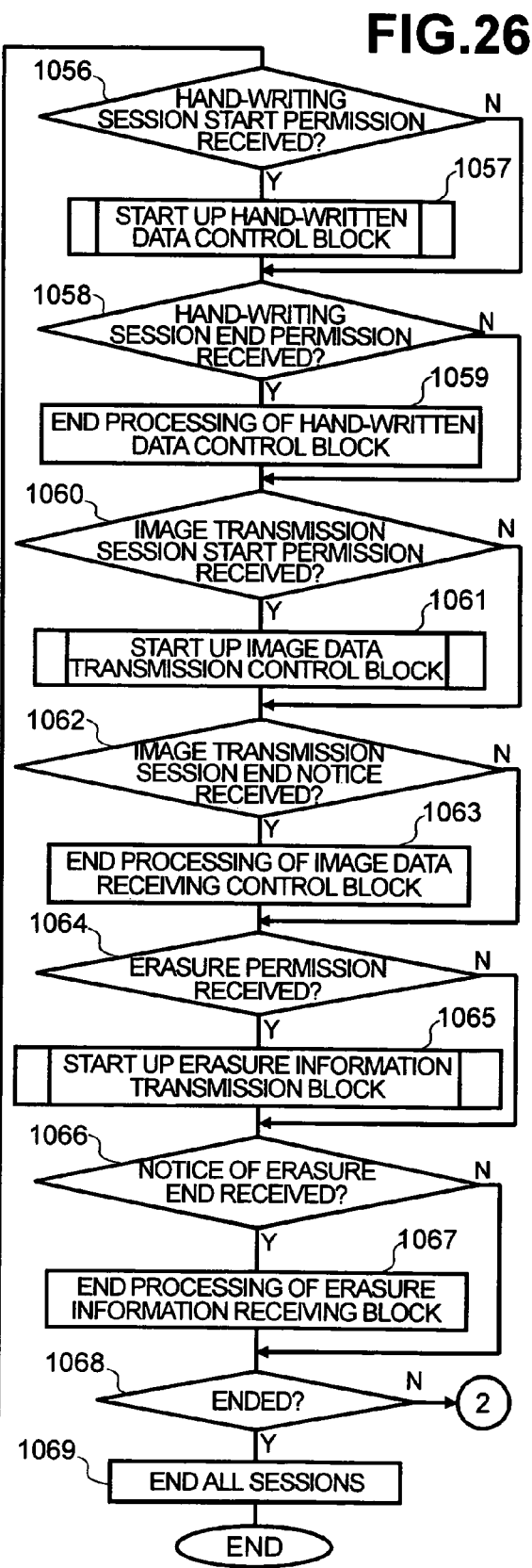
FIG.26

COMMUNICATION SYSTEM AND TERMINAL UNITS CONNECTED THERETO

BACKGROUND OF THE INVENTION

1. Field of the Invention

The present invention relates to a communication system with terminal units connected thereto for interchange of voice data, image data, and handwritten data. In particular, the present invention relates to the communication system with the terminal units that allow a user to interchange voice data at the same time to point to image data being transferred.

2. Description of Related Art

Conventional communication systems that implement communications of still image data, handwritten data, and voices employ the following respective techniques.

JP-A No. 1994-284241 describes "telewriting system," and JP-A No. 2002-330244 describes "voice/image communication system," both showing such communication systems that handle handwritten data and voices as teleconference systems and multi-function facsimiles.

The telewriting system is so designed as to write graphic patterns and characters on the screen of a terminal unit, which is connected to such a network as a telephone line, the Ethernet (trademark), by using pointing device, distribute the written image data to other terminal units, and thereby display the same images on the screens of those terminal units.

The multi-function facsimile is so designed as to once store a handwritten message scanned by a scanner or a message scribbled on a LCD screen, call for a remote facsimile, and then transfer the stored data to the remote facsimile. The facsimile may also implement voice communications with the remote facsimile during image transmission. In this connection, JP-A No. 1993-327973 describes "telewriting terminal unit" designed so as to display the handwritten data communicated between the terminal units by sequentially overwriting the existing image data.

JP-A No. 1993-063874 describes "handwritten data communication terminals" that shows a system capable of sharing the same data among entire terminal units connected to the system. Specifically, the system allows text data and image data (referred to as Basic Image Data contrasted to Handwritten Data, hereinafter) such as source material used in teaching-learning process or conference use to be shared beforehand among the entire terminal units of the system, and allows a user to specify data needed from time to time depending on the progress of the conferences.

JP-A No. 1993-081592 describes "handwritten data communication terminal units" that allows an original owner of the basic image data to specify a starting location for displaying the data when sharing the data between other terminals.

To cope with conditions where a communication speed is liable to vary dynamically due to an increase/decrease in the number of terminal units and line quality after the line goes through deterioration as time passes, two techniques are explained.

JP-A No. 1996-130514 describes the "image communication terminal unit" designed to make the communication speed stable by dynamically changing the error correction code, as well as the encoding and compressing algorithms used for image communication.

In spite of this technique, there are some cases where degradations of communication state occur and accordingly image degradations advance significantly. To cope with such cases, JP-A No. 1998-079823 describes "image transmission apparatus" in which transferring images is put ahead transferring voices by lowering the voice transfer band and suspending retransmission of missing packets while leaving such packet losses as they are.

While foregoing explanations are about conventional techniques applied in communication systems designed so as to handle image data, handwritten data, and voice data, followings are about problems shown in the afore-mentioned techniques.

"Telewriting apparatus" of JP-A No. 1994-284241 takes no consideration for the performance of a terminal unit and the size of a display screen.

"Voice/image communication apparatus" of JP-A No. 2002-330244 got a demerit for being a facsimile, in which handwritten data therethrough is not real-time one. Thus, the apparatus is unsuitable for real-time communication where, e.g., a user on voice communication can also point to images being transferred in order to add characters and graphic patterns for detailing description as required.

"Telewriting apparatus" of JP-A No. 1993-327973 suffers from its design itself to display the handwritten data communicated between the terminal units by sequentially overwriting the existing image data. Concretely, the apparatus undergoes hardship of deletion of text data and basic image data such as source material used in teaching-learning process or conference use from time to time during the progress of the conferences.

As described above in the system of "handwritten data communication terminal unit" of JP-A No. 1993-063874, the afore-mentioned text data and image data may be shared among entire terminal units connected to the system. Its problems are that contents of those data received by respective terminal units might be different with each other due to an interval of time between time points of receiving the data by the respective units; and that the system is unavailable for real-time communication, suffering from inconvenience of impossibility of correction and replacement of those data.

As described above, "Handwritten data communication terminal unit" of JP-A No. 1993-081592 allows the original owner of the basic image data to specify a starting location for displaying the basic image data when sharing the data between other terminals. However, the unit lacks consideration for a positional link between the basic image data and handwritten data to be written afterward. Therefore, the handwritten data that was written considered for a positional relation to the basic image data might be written differently from what was intended, ending up pointing to a meaningless point.

"Image communication terminal unit" of JP-A No. 1996-130514 suffers from following problems. When the unit dynamically changes the error correction code, as well as the encoding and compressing algorithms, the overhead of the terminal unit increases. Particularly, when an error code with a low bit rate is changed to another with a high bit rate and a high error rate redundancy, the load of the terminal unit increases. Thus, the terminal unit comes to require a high throughput processor and/or expensive processing circuit.

"Image transmission apparatus" of JP-A No. 1998-079823 suffers from following problems. For keeping communication quality stable, lowering the voice transfer band and leaving missing packets as they are and without retransmission of them, cause low quality in voice communication. This might bring about a failure of the voice communication where the voice quality of the remote speaker might be a hardly understandable one.

Under such circumstances, the present invention aims at providing a communication system for enabling such a terminal unit as portable one to make smooth voice communications with another terminal unit by pointing to images using voices, images, and handwritten data.

SUMMARY OF THE INVENTION

To solve this, the object of the present invention is to enable a terminal unit to realize communications of handwritten data while basic image data to be used in texts and conference materials is retained in the terminal unit.

Another object of the present invention is to prevent such basic image data from missing while matching of the basic image data between terminal units is kept in less bands and with less processing amount in real time and on demand.

Another object of the present invention is to prevent a pointed position in image data from deviating in communications between the two subject speakers.

Another object of the present invention is to realize communications with high quality handwritten data and voices.

Another object of the present invention is to provide a terminal unit capable of realizing fast and accurate handwritten data communications with no additional processing, CPU power, nor circuit.

The present invention is to achieve at least one of the above objects.

According to one aspect of the present invention, the communication system has a network and at least two or more terminal units connected thereto. Each terminal unit of the system comprises: setting data inputting means for setting a self operation of the terminal and for specifying a remote terminal unit with which the self terminal unit is to communicate; communication control/input/output means for enabling data to be transmitted/received between terminal units through the network; voice inputting means for inputting an external voice to the self terminal unit; handwritten data inputting means for obtaining handwritten data inputted by a user; voice outputting means for outputting voice data from the self terminal to external; displaying means for displaying image data and/or handwritten data; storage means for storing data to be processed by the self terminal unit; input processing means for processing information inputted from the user through the setting data inputting means; session controlling means for controlling a session for enabling transmission/receiving of a voice to/from the remote terminal unit through the communication control/input/output means; voice transmitting means for encoding voice data inputted through the voice inputting means to packet data and transmitting the packet voice data to the remote terminal unit through the communication control/input/output means; voice receiving means for obtaining encoded voice data from the packet received through the communication control/input/output means, then decoding and outputting the voice data through the voice outputting means; image data transmission controlling means for controlling transmission of image data; image data receiving controlling means for controlling receiving if image data; handwritten data controlling means for controlling transmission/receiving of handwritten data; display controlling means for displaying image and handwritten data on the displaying means; erasing/information transmitting means for erasing image data and handwritten data from the displaying means and transmitting the information of erasure completion to the remote terminal unit; erasing/information receiving means for receiving the information of erasure completion from the remote terminal unit and erasing image data and handwritten data from the displaying means according to the information of erasure completion; storing means for storing image data and handwritten data in storage means according to the specification inputted by the user through the setting data inputting means; and image/handwritten data managing means for managing image data and handwritten data to be displayed on the displaying means and to be stored in the storage means.

According to another aspect of the present invention, the session controlling means provided with means for starting and ending voice communication, as well as image and handwritten data communication independently is configured so as to make at least one of image communication, handwritten data communication, and voice communication at a high quality and end other communications even when the through-put of the terminal unit or the number of communication bands is insufficient. Furthermore, the session controlling means can start and end any of image communication and handwritten data communication without requiring user's permission of the receiving side terminal unit registered beforehand.

According to another aspect of the present invention, the image data transmission/receiving controlling means transmits/receives the basic image data with different names given for convenience and different data contents freely.

According to another aspect of the present invention, the image/handwritten data managing means has a plurality of planes and displays the basic image data on one of the planes and handwritten data handled in the current communication process on another plane so that those planes are put in layers and both data are displayed so as to be overlapped.

According to another aspect of the present invention, the display controlling means prepares a coordinate system for each of the basic image data and the handwritten data, enables a position pointed by handwritten data to be exchanged between two subject terminal units, and scrolls the image data and the handwritten data displayed on its displaying means so as to display the data on the displaying means of the remote terminal unit if the position might not be displayed on the displaying means of the remote terminal unit.

According to another aspect of the present invention, the handwritten data controlling means controls handwritten data exclusively at the start of the handwriting so that while one of two terminal units receives/transmits handwritten data, the other cannot.

According to another aspect of the present invention, the handwritten data controlling means collects sampled handwritten data in a chunk at each dynamically predetermined number of sampling times to transmit/receive the sampled handwritten data.

According to another aspect of the present invention, the handwritten data controlling means denotes whether or not a notice is received for each chunk of data alternately between the two subject terminals.

Other and further objects, features and advantages of the invention will appear more fully from the following description.

BRIEF DESCRIPTION OF THE DRAWINGS

FIG. 5 is a screen for selecting data to be erased in the terminal unit of the communication system in the embodiment of the present invention;

FIG. 6 is a screen for selecting data to be stored in the terminal unit of the communication system in the embodiment of the present invention;

FIG. 26 is a flowchart of the processings of a session control unit in the terminal unit of the communication system in the embodiment of the present invention.

DETAILED DESCRIPTION OF THE INVENTION

Figure 1:
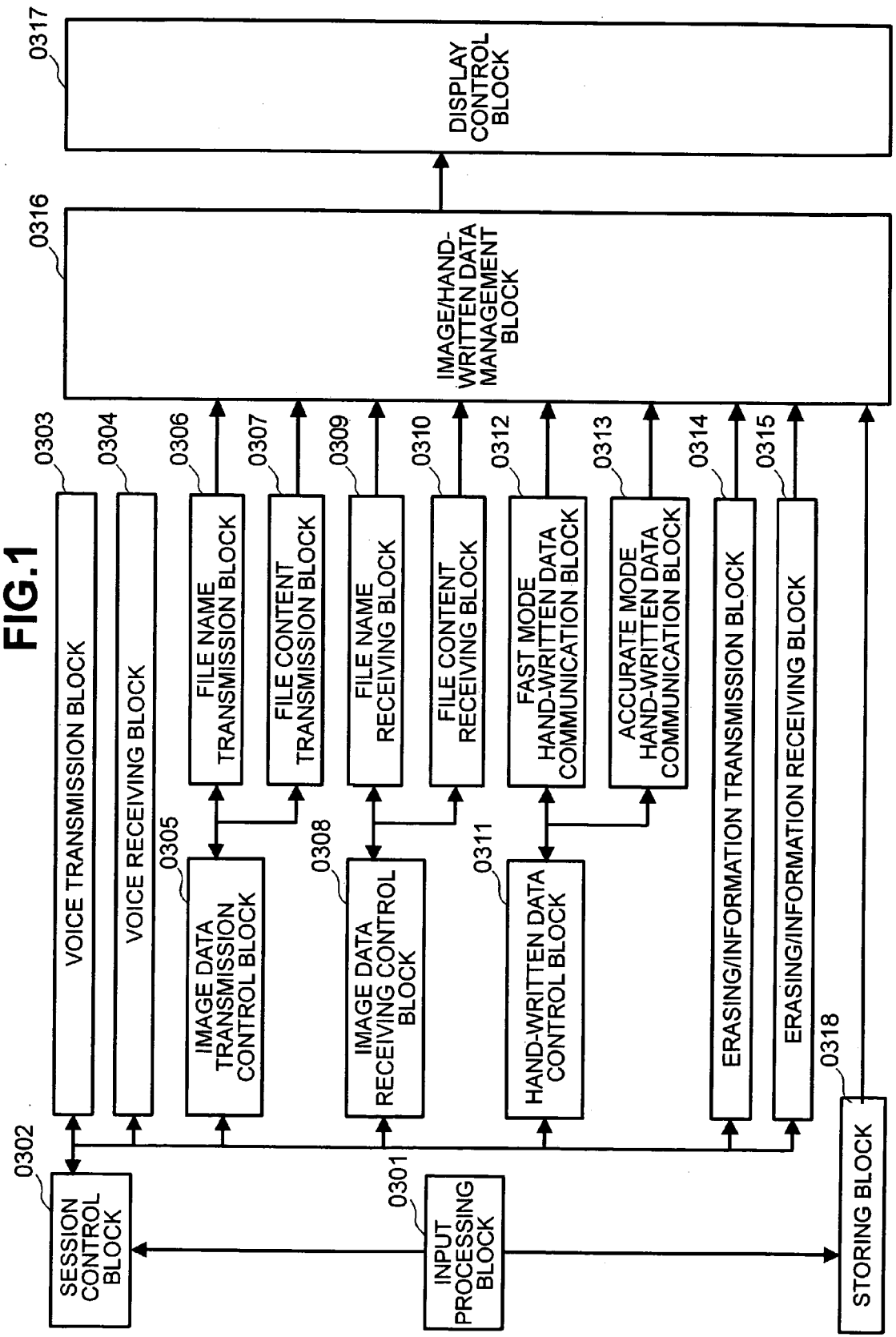
FIG. 1 is a configuration of a software program executed in CPU of a terminal unit of a communication system in an embodiment of the present invention.

As described above, the present invention intends to realize smooth voice communications in such a terminal unit as a portable terminal unit with another by pointing to images with use of voices, images, and handwritten data.

Hereunder, a preferred embodiment of the present invention will be described with reference to the accompanying drawings.

The communication system in the embodiment of the present invention is configured by at least two terminal units. Each of the terminal units is configured so as to communicate with each other through a network.

The network may be any of the IP networks represented by the Internet, public telephone lines, ISDN and PHS networks, portable phone networks, and wireless LANs.

The terminal unit enables the user of the communication system to transmit/receive voice data, image data, and handwritten data. It may be a small portable terminal unit such as a portable phone, PDA, or personal computer system.

Next, the configuration of the terminal unit will be described. The terminal unit is configured by a CPU, a primary memory and a secondary memory that are equivalent to storage means, a voice input device equivalent to voice inputting means, a voice output device equivalent to voice outputting means, a handwritten data input device equivalent to handwritten data inputting means, a display device equivalent to displaying means, a setting data input device equivalent to setting data inputting means, and a communication control/input/output device equivalent to communication control/input/output means. Those devices are connected to each other through a bus so as to exchange data among them.

The setting data input device may be any of an operation button, a mouse, and such a pointing device as a pen input device. The input device is used to input information for setting operations of the terminal unit, the address of each remote terminal unit, such as a phone number or IP address. The input device can also be used to instruct both starting and ending of a communication.

The communication control/input/output device is configured by a wireless LAN card used, for example, a wireless LAN, network card, or module for connecting the terminal unit to a PHS/portable phone network. The device enables this terminal unit to be connected to a network through this communication control/input/output device. This terminal unit and the remote terminal unit can thus start and end a session to transmit/receive data through the network.

The voice input device is configured by a microphone, etc. and used to convert external voices to digital voice data inputted to the terminal unit.

The handwritten data input device may be a mouse or such a pointing device as a pen input device and used to obtain coordinates (point) of handwritten data inputted by the user. After obtaining an inputted point, the device also obtains information denoting whether the point is a starting point or ending point of a line or a middle point of the line.

The CPU may be, for example, a general-purpose processor. This CPU controls the operation of this terminal unit according to a program that prescribes the operation of this terminal unit.

The voice output device is configured by a speaker or the like and converts digital voice data generated in this terminal unit to analog voice data, then outputs the analog voice data to external.

The display device is configured by a liquid crystal panel or the like and displays menus and guidance information to facilitate the user to input information through the setting data input device, as well as information inputted by the user. The display device also displays handwritten data such as points, lines inputted through the handwritten data input device, as well as handwritten data received from the remote terminal unit through the communication control/input/output device. Furthermore, the display device displays image data stored in the primary and secondary memories, as well as image data communicated with the remote terminal unit through the communication control/input/output device.

The primary memory is configured by a RAM and/or ROM and stores programs to be executed by the CPU, voice data inputted through the voice input device, handwritten data inputted through the handwritten data input device, data to be inputted/output through the communication control/input/output device, voice data to be output through the voice output device, handwritten data and image data to be displayed on the display device. All those data are processed by the CPU.

The secondary memory is configured by a non-volatile memory as a flash memory, hard disk, or the like and stores data that is very important and desired not to be lost even when the power supply of this terminal unit is turned off, for example, address data such as the phone number and/or IP address of the remote terminal unit, as well as transmitted/received hand-writing data or image data.

Next, a description will be made for a configuration of a program to be executed by the CPU of this terminal unit. FIG. 1 shows the configuration of the program to be executed by the CPU of this terminal unit.

As shown in FIG. 1, the program executed by the CPU is configured by an input processing block 0301 equivalent to the input processing means, a session control block 0302 equivalent to the session controlling means, a voice transmission block 0303 equivalent to the voice transmitting means, a voice receiving block 0304 equivalent to the voice receiving means, an image data transmission control block 0305 equivalent to the image data transmission controlling means, a file name transmission block 0306, a file content transmission block 0307, an image data receiving control block 0308 equivalent to the image data receiving controlling means, a file name receiving block 0309, a file content receiving block 0310, a handwritten data control block 0311 equivalent to the handwritten data controlling means, a fast mode handwritten data communication block 0312, an accurate mode handwritten data communication block 0313, an erasing/information transmission block 0314 equivalent to the erasing/information transmitting means, an erasing/information transmission block 0314 equivalent to the erasing/information receiving means, an image/handwritten data management block 0316 equivalent to the image/handwritten data managing means, a display control block 0317 equivalent to the display controlling means, and a storing block 0318 equivalent to the storing means.

The input processing block 0301 processes information inputted by the user through the setting data input device.

The session control block 0302 controls each session so as to enable transmission/receiving of voice data, image data, and handwritten data to/from a remote terminal unit through the communication control/input/output device.

The voice transmission block 0303 encodes and packets voice data inputted through the voice input device and transmits the packeted data to the remote terminal unit through the communication control/input/output device.

The voice receiving block 0304 obtains encoded voice data from voice data packets received through the communication control/input/output device to decode and outputs the voice data through the voice output device.

The image data transmission control block 0305 controls transmission of image data to a remote terminal unit through the setting data input device. At this time, the image data transmission control block 0305 determines whether to transmit only the name or content of the subject image data file to the remote terminal unit according to the information inputted by the user, then starts up the file name transmission block 0306 or file content transmission block 0307 according to the result of this determination and transmits the image data to the remote terminal unit.

The file name transmission block 0306 transmits the name of an image file specified by the user through the setting data input device to the remote terminal unit through the communication control/input/output device and instructs the image/handwritten data management block 0316 to display the image data stored in the self terminal unit as the file content on the display device.

On the other hand, the file content transmission block 0307 transmits the content of an image file specified by the user through the setting data input device to the remote terminal unit through the communication control/input/output device and instructs the image/handwritten data management block 0316 to display the stored image data as the specified file content on the display device.

The image data receiving control block 0308 controls receiving of image data transmitted from the remote terminal unit through the communication control/input/output device. At this time, the image data receiving control block 0308 determines whether the remote terminal unit is to transmit only the file name or the file content, then determines whether to receive only the file name or the file content according to the result of the determination. The image data receiving control block 0308 then starts up the file name receiving block 0309 or file content receiving block 0310 according to the result of this determination to receive the image data.

The file name receiving block 0309 then receives the name of the image file from the remote terminal unit through the communication control/input/output device and instructs the image/handwritten data management block 0316 to display the image data stored as the specified file content on the display device.

On the other hand, the file content receiving block 0310 receives the file content from the remote terminal unit through the communication control/input/output device and instructs the image/handwritten data management block 0316 to display the image data stored as the specified file content on the display device.

The fast mode handwritten data communication block 0312 transmits/receives handwritten data inputted by the user through the handwritten data input device to/from the remote terminal unit through the communication control/input/output device. While transmitting/receiving handwritten data, the fast mode handwritten data communication block 0312 transmits handwritten data as much as possible. At this time, the transmitting side terminal unit does not confirm whether or not the receiving side terminal unit has received data normally, then instructs the image/handwritten data management block 0316 to display the transmitted handwritten data on the display device. On the other hand, the receiving side terminal unit instructs the image/handwritten data management block 0316 to display the handwritten data received from the remote (transmitting side) terminal unit through the communication control/input/output device on the display device.

The accurate mode handwritten data communication block 0313 transmits/receives handwritten data inputted by the user through the handwritten data input device to/from the remote terminal unit through the communication control/input/output device. In transmitting/receiving handwritten data: the transmitting side terminal unit transmits handwritten data by confirming that data is received normally by the receiving side terminal unit and instructs the image/handwritten data management block 0316 to display the transmitted handwritten data on the display device; and the receiving side terminal unit instructs the image/handwritten data management block 0316 to display the received handwritten data from the remote terminal on the display device.

The handwritten data control block 0311 controls transmission and receiving of handwritten data. At this time, the handwritten data control block 0311 determines whether to use the fast mode handwritten data communication block 0312 or accurate mode handwritten data communication block 0313 to transmit/receive the handwritten data according to the specification information inputted by the user through the setting data input device. The handwritten data control block 0311 then starts up the handwritten data transmission/receiving block in the determined mode to transmit/receive the handwritten data.

The erasing/information transmission block 0314 determines whether to erase only handwritten data, only image data, or both of handwritten data and image data according to the specification information inputted by the user through the setting data input device, then transmits the determined erasure information to the remote terminal unit. The erasing/information transmission block 0314 thus instructs the image/handwritten data management block 0316 to erase the determined data from the display device of the self terminal unit.

The erasing/information receiving block 0315 receives the information of completion of the erasure from the remote terminal unit and instructs the image/handwritten data management block 0316 to erase only the handwritten data, only the image data, or both of the handwritten data and the image data from the display device of its terminal unit according to the received information.

The image/handwritten data management block 0316 manages both handwritten data and image data to be displayed on the display device and displays the image data on the display device according to the request issued from the file name transmission block 0306, file content transmission block 0307, file name receiving block 0309, or file content receiving block 0310. The image/handwritten data management block 0316 also displays the handwritten data on the display device according to the request issued from the fast mode handwritten data communication block 0312 or accurate mode handwritten data communication block 0313. Furthermore, the image/handwritten data management block 0316 erases only the handwritten data, only the image data, or both of the handwritten data and the image data from the display device according to the request issued from the erasing/information transmission block 0314 or erasing/information receiving block 0315.

The display control block 0317 displays the handwritten data and/or image data specified by the image/handwritten data management block 0316. At this time, if it is impossible to display the latest handwritten data on the display device, the display control block 0317 changes the image display position so as to display the latest handwritten data and the image corresponding to the position of the handwritten data on the display device.

The storing block 0318 obtains only the handwritten data, only the image data, or both of the handwritten data and the image data from the image/handwritten data management block 0316 according to the specification information inputted by the user through the setting data input device and stores the obtained data in the primary or secondary storage device.

Next, a description will be made in detail for the processings of each block described above.

At first, a description will be made for the processings of the input processing block 0301 and for a configuration of a user interface used for those processings with reference to the accompanying drawings.

Figure 2:
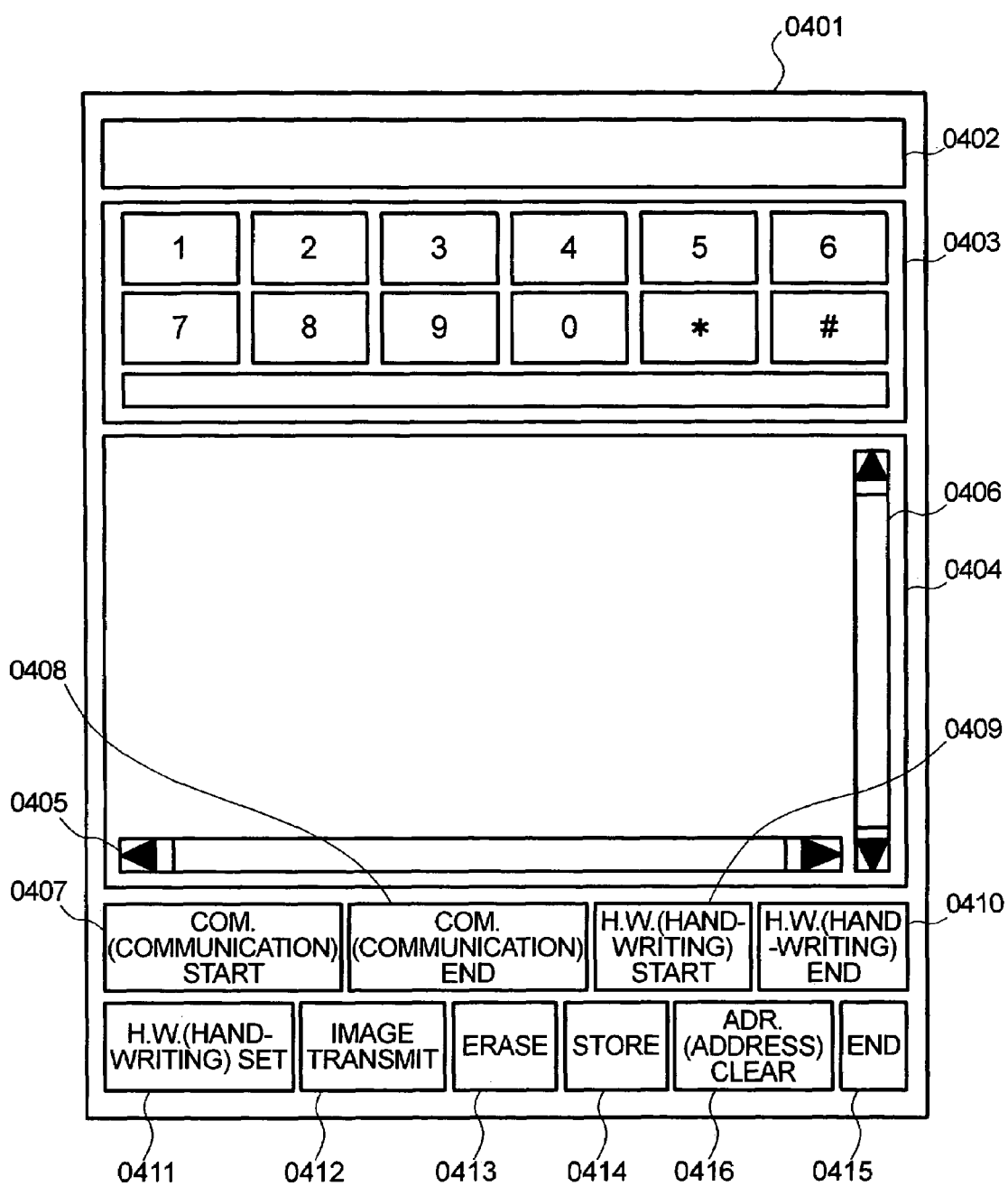
FIG. 2 is a user interface used in the communication system in the embodiment of the present invention.

FIG. 2 shows a configuration of the interface provided in the terminal unit of this communication system.

As shown in FIG. 2, the user interface 0401 provided in this communication system is configured by an address display area 0402, an address input button group 0403, a handwritten data input/display area 0404, a horizontal position scroll bar 0405, a vertical position scroll bar 0406, a COM.(communication) START button 0407, a COM.(communication) END button 0408, a H.W. (hand-writing) START button 0409, a H.W. (hand-writing) END button 0410, a H.W. (hand-writing) SET button 0411, an I. TRANSMIT button 0412, an ERASE button 0413, a STORE button 0414, an END button 0415, and an ADR. (address) CLEAR button 0416.

The address display area 0402 displays the address of a remote terminal unit inputted by the user through the setting data input device with use of the address input button group 0403. The address of the remote terminal unit may be a phone number, IP address, or the like of the remote terminal unit, for example.

The user can operate the address input button group 0403 through the setting data input device. Consequently, the user can input the address of a remote terminal unit. The address input button group 0403 may not necessarily be configured by number buttons; for example, they may be buttons and character recognition pads for inputting identification names of remote terminal units.

The user can input handwritten data to the handwritten data input/display area 0404 through the handwritten data input device. The handwritten data input/display area 0404 also displays handwritten data received from a remote terminal unit through the communication control/input/output device. In addition, the handwritten data input/display area 0404 displays image data transmitted/received by the user to/from a remote terminal.

The user can use the horizontal position scroll bar 0405 through the setting data input device to instruct the terminal unit to scroll the horizontal position of the handwritten data/image data displayed in the handwritten data input/display area 0404.

The user can use the vertical position scroll bar 0406 through the setting data input device to instruct the terminal unit to scroll the vertical position of the handwritten data/ image data displayed in the handwritten data input/display area 0404.

The COM. START 0407 button, when pressed by the user through the setting data input device, instructs the self terminal unit to start transmitting/receiving of voice data to/from the remote terminal unit whose address is displayed in the address display area 0402.

The COM. END button 0408, when pressed by the user through the setting data input device, instructs the self terminal unit to end transmitting/receiving of voice data to/from the remote terminal unit.

The H.W. START 0409 button, when pressed by the user through the setting data input device, instructs the self terminal unit to start transmitting/receiving of handwritten data to/from the remote terminal unit whose address is displayed in the address display area 0402.

The H.W. END button 0410, when pressed by the user through the setting data input device, instructs the self terminal unit to end transmitting/receiving of handwritten data to/from the remote terminal unit.

The H.W. SET button 0411, when pressed by the user through the setting data input device, selects the handwriting mode for transmitting/receiving handwritten data.

Figure 3:
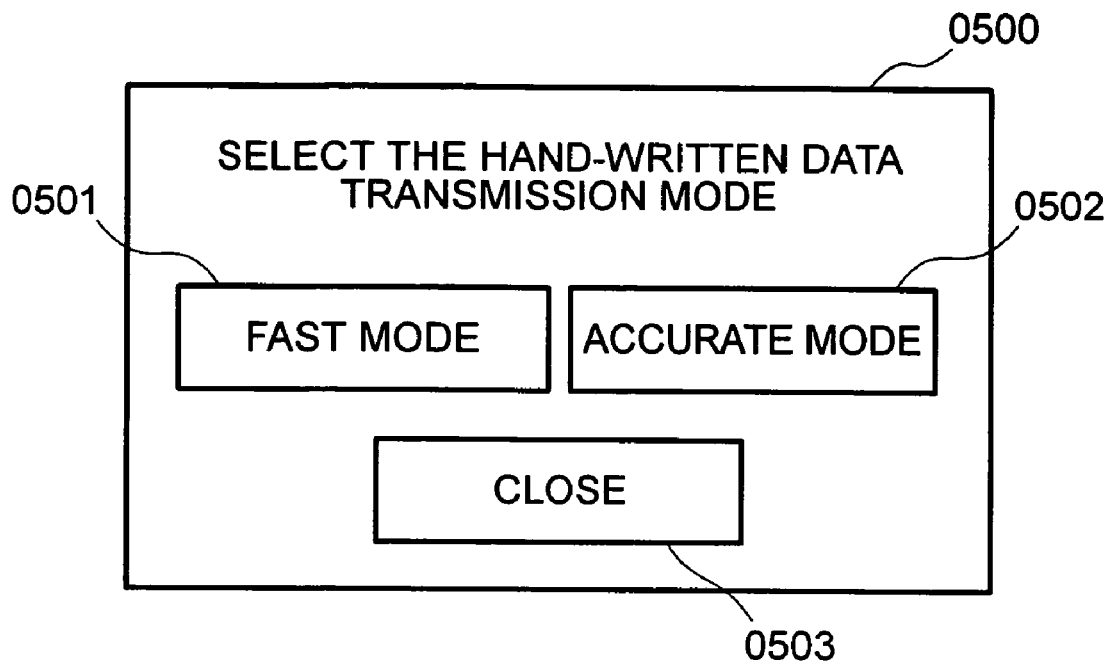
FIG. 3 is a screen for selecting a handwriting mode in the terminal unit of the communication system in the embodiment of the present invention.

At this time, the user can instruct the self terminal unit to transmit the selected mode to the remote terminal unit so that handwritten data is transmitted/received in the selected mode between the two subject terminal units. In this case, for example, the user can instruct the self terminal unit to display the handwritten mode selection screen 0500 shown in FIG. 3 on the display device so that the user can select any of the fast mode and the accurate mode to transmit/receive handwritten data and the self terminal unit transmits the selected mode to the remote terminal unit, thereby handwritten data is transmitted/received between the two subject terminal units in the selected mode. In FIG. 3, the handwritten data selection screen 0500 is configured by a fast mode button 0501, an accurate mode button 0502, and a close button 0503. The user can select the fast mode to transmit/receive handwritten data by pressing the fast mode button 0501 on the handwritten mode selection screen 0500 through the setting data input device so that the self terminal unit transmits the selected mode to the remote terminal unit, thereby handwritten data is transmitted/received between the two subject terminal units in the mode. On the other hand, the user can select the accurate mode to transmit/receive handwritten data by pressing the accurate mode button 0502 on the handwritten mode selection screen 0500 through the setting data input device so that the self terminal unit transmits the selected mode to the remote terminal unit, thereby handwritten data is transmitted/ received between the two subject terminal units in the mode. The user can also instruct the self terminal unit to end the display of the handwritten mode selection screen 0500 by pressing the close button 0503 through the setting data input device on the handwritten mode selection screen 0500.

Figure 4:
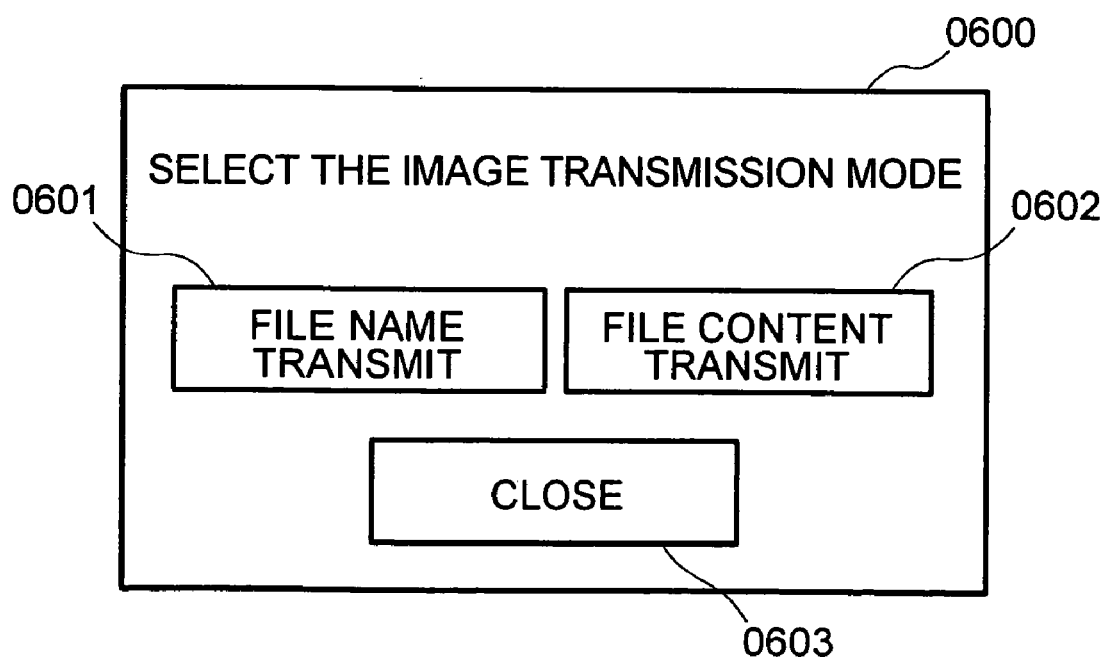
FIG. 4 is a screen for selecting an image transmission mode in the terminal unit of the communication system in the embodiment of the present invention.

In FIG. 2, the user can press the I.(image) TRANSMIT button 0412 through the setting data input device to instruct the self terminal unit to transmit image data to the remote terminal unit. At this time, the user can also instruct the self terminal unit to display the image transmission selection screen 0600 shown in FIG. 4 on the display device to select the image transmission mode for transmitting the file name or file content. The user can also instruct the self terminal unit to transmit the selected mode to the remote terminal unit, thereby image data is transmitted/received between the two subject terminal units in the selected mode. In FIG. 4, the image transmission selection screen 0600 is configured by an F.(file) NAME button 0601, an F. (file) CONTENT button 0602, and a CLOSE button 0603. The F. NAME (file name transmission) button 0601, when pressed by the user through the setting data input device, selects the file name transmission mode to transmit only the file name in the image transmission and specify that the self terminal unit transmits the selected mode to the remote terminal unit, thereby image data is transmitted/received between the two subject terminal units in the selected mode. On the image transmission selection screen 0600, the user can also press the file content transmission (F. CONTENT) button 0602 through the setting data input device to select the file content transmission mode to transmit the file content in the image transmission and specify that the self terminal unit transmits this selected mode to the remote terminal unit, thereby image data is transmitted/received between the two subject terminal units in the selected mode. Furthermore, the user can press the close (CLOSE) button 0603 through the setting data input device to instruct the self terminal unit to end the display of the image transmission selection screen 0600.

Return to FIG. 2 again. The ERASE button 0413, when pressed by the user through the setting data input device, instructs the self terminal unit to erase handwritten data and/ or image data displayed in the handwritten data input/display area 0404 on the display device and transmits erasure information to the remote terminal unit so that the remote terminal unit erases handwritten data and/or image data displayed in the handwritten data input/display area 0404 on its display device. At this time, the erasure content selection screen 0700 shown in FIG. 5 can be displayed on the display device for the user to press the ERASE button 0413 through the setting data input device to select erasure of only the handwritten data, only image data, or both of the handwritten data, as well as the image data displayed in the handwritten data input/display area 0404 on the display device of the self terminal unit and instruct the self terminal unit to erase the selected object from the handwritten data input/display area 0404 on the display device and transmit erasure information to the remote terminal unit so that the remote terminal erases the selected object displayed in the handwritten data input/display area 0404 on its display device. In FIG. 5, the erasure content selection screen 0700 is configured by an H.W ERASE (handwritten erasure) button 0701, an I. ERASE (image erasure) button 0702, and an ALL ERASE button 0703, and a CLOSE button 0704. The H.W. ERASE button 0701, when pressed by the user through the setting data input device, instructs the self terminal unit to erase the handwritten data displayed in the handwritten data input/display area 0404 and transmit erasure information to the remote terminal unit, thereby the remote terminal erases the handwritten data displayed in the handwritten data input/display area 0404 on its display device. On the erasure content selection screen 0700, the user can also press the I. ERASE (image erasure) button 0702 through the setting data input device to instruct the self terminal unit to erase the image data displayed in the handwritten data input/ display area 0404 and transmit erasure information to the remote terminal unit so that the remote terminal unit erases the image data displayed in the handwritten data input/display area 0404 on its display device. Furthermore, the user can press the ALL STORE button 0703 through the setting data input device on the erasure content selection screen 0700 to instruct the terminal unit to erase both of the handwritten data and the image data displayed in the handwritten data input/display area 0404 and transmit erasure information to the remote terminal unit so that the remote terminal unit erases both of the handwritten data and the image data displayed in the handwritten data input/display area 0404 on its display device. Furthermore, the user can press the CLOSE button 0704 on the erasure content selection screen 0700 through the setting data input device to instruct the self terminal unit to end the display of the erasure content selection screen 0700.

Return to FIG. 2 again. The STORE button 0414, when pressed by the user through the setting data input device, instructs the self terminal unit to store the handwritten data and the image data displayed in the handwritten data input/display area 0404 on the display device. At this time, a screen for selecting the content to be stored 0800 shown in FIG. 6 is displayed on the display device so that the user can select whether to store only the handwritten data, only the image data, or merge the handwritten data and the image data displayed in the handwritten data input/display area 0404 on the display device through the setting data input device and store the merged data and instruct the self terminal unit to store the selected object. In FIG. 6, the screen 0800 is configured by an H.W STORE button 0801, an I. STORE button 0802, an ALL STORE button 0803, and a CLOSE button 0804. The H.W. STORE button 0801, when pressed by the user through the setting data input device, instructs the self terminal unit to store the handwritten data displayed in the handwritten data input/display area 0404. On the screen 0800, the I. STORE button 0802, when pressed by the user through the setting data input device, instructs the self terminal unit to store the image data displayed in the handwritten data input/display area 0404. The ALL STORE button 0803, when pressed by the user through the setting data input device, instructs the self terminal unit to merge the handwritten data and the image data displayed in the handwritten data input/display area 0404 on the screen 0800 and store the merged data. Furthermore, the CLOSE button 0804, when pressed by the user through the setting data input device, instructs the self terminal unit to end the display of the target content selection screen 0800.

Return to FIG. 2 again. The END button 0415, when pressed by the user through the setting data input device, instructs the self terminal unit to end the display of the screen 0401 and ends the processing of this communication system.

The ADR. CLEAR button 0416, when pressed by the user through the setting data input device, instructs the self terminal unit to clear the address displayed in the address display area 0402.

Figure 7:
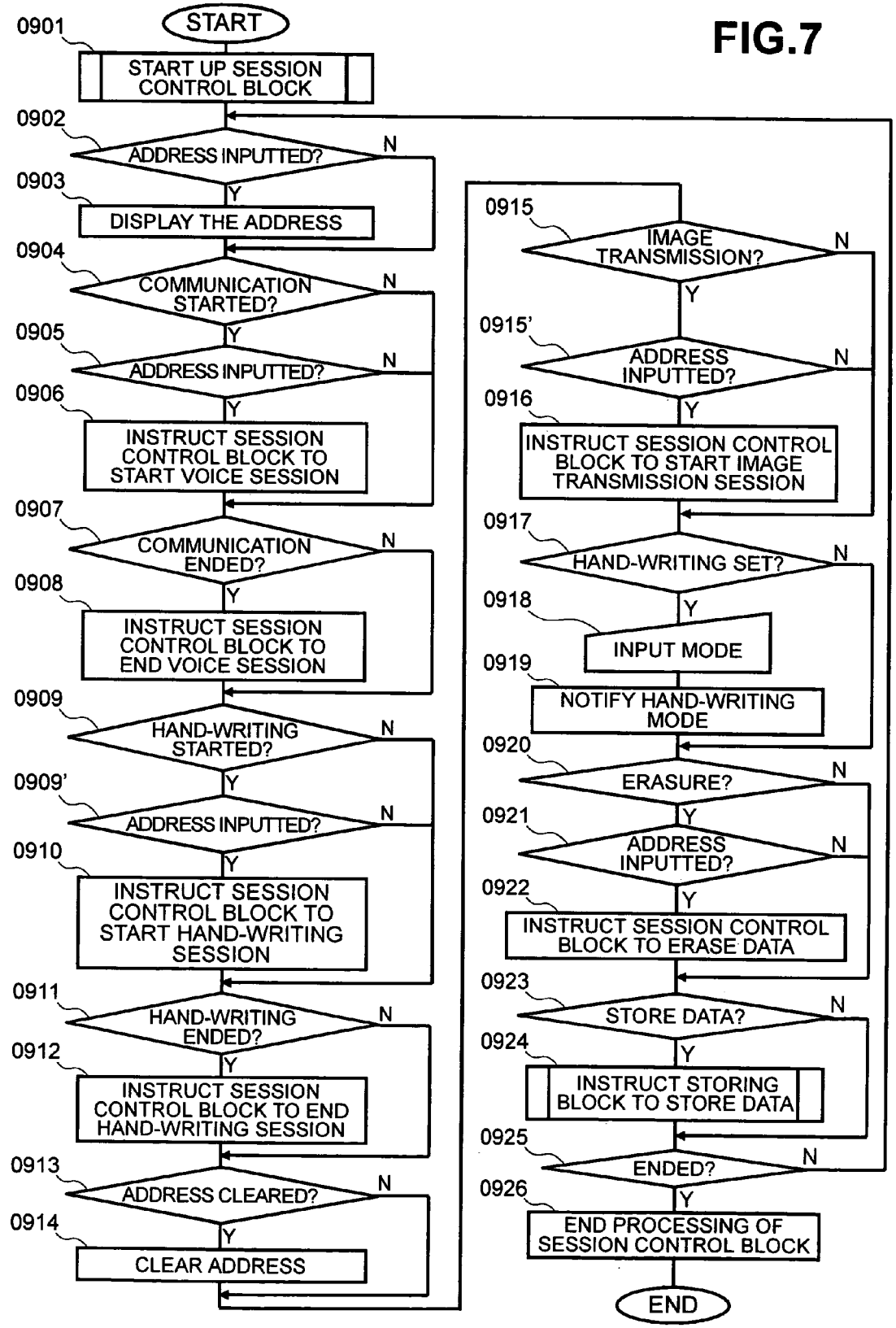
FIG. 7 is a flowchart of the processings of an input processing block provided in the terminal unit of the communication system in the embodiment of the present invention.

Next, a description will be made for a series of the processings of the input processing block 0301 executed under the control of the CPU during a period between when the block 0301 is started up together with this communication system and when this communication system is ended with the system END button pressed by the user with reference to FIG. 7. FIG. 7 shows a flowchart of the processings executed by the input processing block 0301. The input processing block 0301 is realized as a task separately from those of other software components and executed under the control of the CPU in parallel to the tasks of other software components.

As shown in FIG. 7, at first, the input processing block 0301 starts up the session control block 0302 (step 0901). The operation and processing contents of the session control block 0302 will be described later.

The input processing block 0301 then determines whether or not any button of the address input button group 0403 is pressed by the user through the setting data input device (step 0902). If the determination result is YES (pressed), the input processing block 0301 displays the data corresponding to the pressed button in the address display area 0402 (step 0903). The address is, for example, a phone number or IP address of the remote terminal unit.

After that, the input processing block 0301 determines whether or not the COM. START button 0407 is pressed by the user through the setting data input device while no voice session is established (step 0904). If the determination result is YES (pressed), the input processing block 0301 further determines whether or not an address is displayed in the address display area 0402 (step 0905). If the determination result in step 0905 is YES (displayed), the input processing block 0301 instructs the session control block 0302 to start a voice session (step 0906). To instruct the session control block 0302 to start a voice session such way, the input processing block 0301 may transmit an event denoting the start of the voice session, for example, to the session control block 0302.

After that, the input processing block 0301 determines whether or not the COM. END button 0408 is pressed by the user through the setting data input device while a voice session is established (step 0907). If the determination result is YES (pressed), the input processing block 0301 instructs the session control block 0302 to end the voice session (step 0908). To instruct the session control block 0302 to end a voice session such way, the input processing block 0301 can also transmit an event denoting the end of the voice session, for example, to the session control block 0302.

Then, the input processing block 0301 further determines whether or not the H.W. (hand-writing) START button 0409 is pressed by the user through the setting data input device while no hand-writing session is established (step 0909). If the determination result is YES (pressed), the input processing block 0301 further determines whether or not an address is displayed in the address display area 0402 (step 0909'). If the determination result is YES (displayed), the input processing block 0301 instructs the session control block 0302 to start the handwriting session (step 0910). To instruct the session control block 0302 to start a hand-writing session such way, the input processing block 0301 can also transmit an event denoting the start of the hand-writing session, for example, to the session control block 0302.

After that, the input processing block 0301 determines whether or not the H.W. END button 0410 is pressed by the user through the setting data input device while a handwriting session is established (step 0911). If the determination result is YES (pressed), the input processing block 0301 instructs the session control block 0302 to end the handwriting session (step 0912).

To instruct the session control block 0302 to end a voice session such way, the input processing block 0301 can also transmit an event denoting the end of the voice session, for example, to the session control block 0302.

Then, the input processing block 0301 determines whether or not the ADR. CLEAR button 0416 is pressed by the user through the setting data input device (step 0913). If the determination result is YES (pressed), the input processing block 0301 clears the address displayed in the address display area 0402 (step 0914).

After that, the input processing block 0301 determines whether or not the I. TRANSMIT button 0412 is pressed by the user through the setting data input device while no image transmission session is established (step 0915). If the determination result is YES (pressed), the input processing block 0301 then determines whether or not an address is displayed in the address display area 0402 (step 0915'). If the determination result is YES (displayed), the input processing block 0301 instructs the session control block 0302 to start an image transmission session (step 0916). To instruct the session control block 0302 to start an image transmission session such way, the input processing block 0301 can also transmit an event denoting the start of the image transmission, for example, to the session control block 0302.

The input processing block 0301 then determines whether or not the H.W. SET button 0411 is pressed by the user through the setting data input device (step 0917). If the determination result is YES (pressed), the input processing block 0301 displays the handwritten mode selection screen 0500 and waits until the fast mode or accurate mode is selected to transmit/receive handwritten data to/from the user (step 0918). The input processing block 0301 then reports the selected mode to the handwritten data control block 0311 (step 0919). To report a selected mode to the session control block 0302 such way, the input processing block 0301 can also set the new mode, for example, in the handwritten data control block 0311 and transmit an event denoting the selected new mode to the handwritten data control block 0311. However, if the CLOSE button 0503 is pressed while the user selects no mode in step 0918, the input processing block 0301 suppresses reporting of the selected mode to the handwritten data control block 0311 in step 0918.

After that, the input processing block 0301 determines whether or not the ERASE button 0413 is pressed by the user through the setting data input device (step 0920). If the determination result is YES (pressed), the input processing block 0301 further determines whether or not an address is displayed in the address display area 0402 (step 0921). If the determination result is YES (displayed), the input processing block 0301 instructs the session control block 0302 to erase the address (step 0922). To instruct the session control block 0302 to erase an address such way, the input processing block 0301 cal also transmit an event denoting an erasure processing, for example, to the session control block 0302.

Then, the input processing block 0301 determines whether or not the STORE button 0414 is pressed by the user through the setting data input device (step 0923). If the determination result is YES (pressed), the input processing block 0301 executes the processings of the storing block 0318 (step 0924). The processing content of the storing block 0318 will be described later.

After that, the input processing block 0301 further determines whether or not the END button 0415 is pressed by the user through the setting data input device (step 0925). If the determination result is NO (not pressed), the input processing block 0301 returns to step 0902 to repeat the processings in steps 0902 to 0925 until the user presses the END button 0415.

On the other hand, If the determination result is YES (pressed) in step 0925, the input processing block 0301 ends the processing of the session control block 0302 (step 0926), then ends its own processing.

Figure 8:
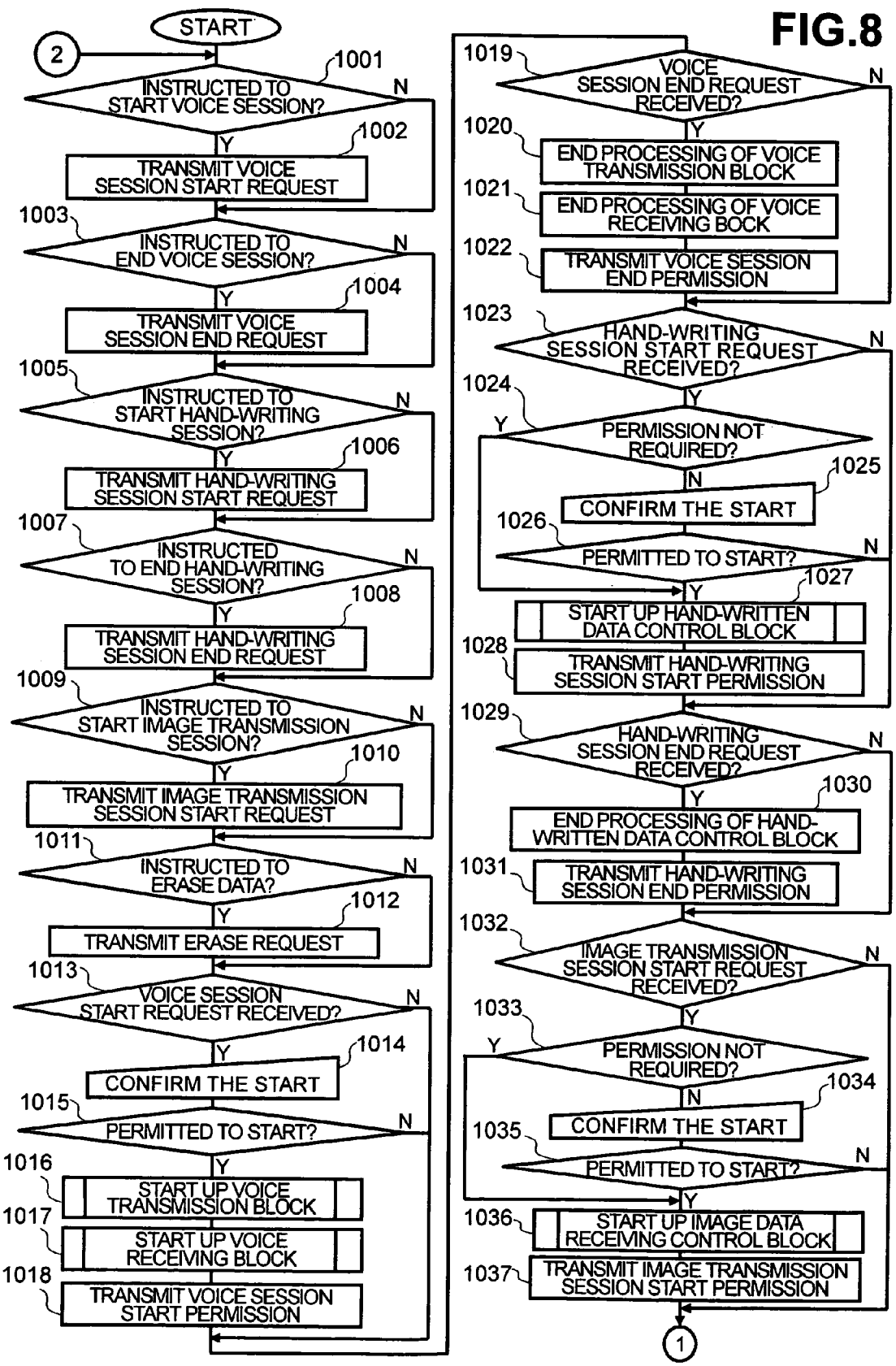
FIG. 8 is a first-half flowchart of the processings of a session control block provided in the terminal unit of the communication system in the embodiment of the present invention.

Next, a description will be made for the processings of the session control block 0302 started and ended by the input processing block 0301 under the control of the CPU during the while with reference to FIGS. 8 and 26. FIGS. 8 and 26 are flowcharts of the processings executed under the control of the session control block 0302. This session control block 0302 is configured as a task separately from those of other software components and executed in parallel with the tasks of those other software components under the control of the CPU.

As shown in FIGS. 8 and 26, at first, the session control block 0302 determines whether or not it is instructed from the input processing block 0301 to start a voice session (step 1001). If the determination result is YES (instructed), the session control block 0302 transmits a voice session start request to the address displayed in the address display area 0402, that is, the target remote terminal unit through both of the communication control/input/output device and the network (step 1002). To determine whether or not it is instructed from the input processing block 0301 to start a voice session such way, the session control block 0302 can also make the determination by checking whether or not it has received an event denoting the start of the voice session from, for example, the input processing block 0301. The voice session starting method regulated by the RFC2543 may also be used as the procedure to request the start of such a voice session.

Then, the session control block 0302 determines whether or not it is instructed by the input processing block 0301 to end the voice session (step 1003). If the determination result is YES (instructed), the session control block 0302 transmits a voice session end request to the address displayed in the address display area 0402, that is, the target remote terminal unit through both of the communication control/input/output device and the network (step 1004). To determine whether or not it is instructed by the input processing block 0301 to end the voice session such way, the session control block 0302 can make the determination by checking whether or not it has received an event denoting the end of the voice session from, for example, the input processing block 0301. The voice session ending method regulated by the RFC2543 may also be used as the procedure to request the end of such a voice session.

After that, the session control block 0302 determines whether or not it is instructed from the input processing block 0301 to start a hand-writing session (step 1005). If the determination result is YES (instructed), the session control block 0302 transmits a hand-writing session start request to the address displayed in the address display area 0402, that is, the target remote terminal unit through both of the communication control/input/output device and the network (step 1006). To determine whether or not it is instructed by the input processing block 0301 to start the handwriting session such way, the session control block 0302 can make the determination by checking whether or not it has received an event denoting the start of the hand-writing session from, for example, the input processing block 0301. The data session starting method regulated by the RFC2543 may also be used as the procedure to request the start of such a hand-writing session.

The session control block 0302 then determines whether or not it is instructed by the input processing block 0301 to end the hand-writing session (step 1007). If the determination result is YES (instructed), the session control block 0302 transmits a hand-writing session end request to the address displayed in the address display area 0402, that is, the target remote terminal unit through both of the communication control/input/output device and the network (step 1008). To determine whether or not it is instructed by the input processing block 0301 to end the hand-writing session such way, the session control block 0302 can make the determination by checking whether or not it has received an event denoting the end of the hand-writing session from, for example, the input processing block 0301. The data session ending method regulated by the RFC2543 may also be used as the procedure to request the end of such a hand-writing session.

After that, the session control block 0302 determines whether or not it is instructed by the input processing block 0301 to start an image data transmission session (step 1009). If the determination result is YES (instructed), the session control block 0302 transmits an image data transmission session start request to the address displayed in the address display area 0402, that is, the target remote terminal unit through both of the communication control/input/output device and the network (step 1010). To determine whether or not it is instructed by the input processing block 0301 to start an image data transmission session such way, the session control block 0302 can make the determination by checking whether or not it has received an event denoting the start of the image data transmission session from, for example, the input processing block 0301. The data session starting method regulated by the RFC2543 may also be used as the procedure to request the start of such an image transmission session.

The session control block 0302 then determines whether or not it is instructed from the input processing block 0301 to erase data (step 1011). If the determination result is YES (instructed), the session control block 0302 transmits an erasure request to the address displayed in the address display area 0402, that is, the target remote terminal unit through both of the communication control/input/output device and the network (step 1012). To determine whether or not it is instructed by the input processing block 0301 to erase some data such way, the session control block 0302 can make the determination by checking whether or not it has received an event denoting the erasure from, for example, the input processing block 0301. The data session starting method regulated by the RFC2543 may also be used as the procedure to request such an erasure processing.

The session control block 0302 then determines whether or not it has received a voice session start request from the remote terminal unit through the communication control/input/output device and the network (step 1013). If the determination result is YES (received), the session control block 0302 requests the user to confirm the start of the voice session (step 1014). The voice session starting method regulated by the RFC2543 may also be used as the procedure to request the start of such a voice session. To request the user to confirm the start of the voice session in this case, it is also possible to display a screen on the display device to prompt the user to permit the start of the voice session, thereby the user can input necessary data on the screen through the setting data input device to transmit permission or rejection of the start of the voice session to the terminal unit that is the voice session start request source, that is, the remote terminal unit that has requested the voice communication.

Return to the description for the session control block 0302 shown in FIGS. 8 and 26. The session control block 0302 determines whether or not the start of the voice session is permitted by the user (step 1015) as a result of the confirmation in step 1014. If the determination result is YES (permitted), the session control block 0302 starts up the voice transmission block 0303 and the voice receiving block 0304 (steps 1016 and 1017), then transmits a voice session start permission notice to the remote terminal unit through the communication control/input/output device and the network (step 1018). The voice session starting method regulated by the RFC2543 may also be used as the procedure to request such a voice session start permission.

After that, the session control block 0302 determines whether or not it has received a voice session end request from the remote terminal through the communication control/input/output device and the network (step 1019). If the determination result is YES (received), the session control block 0302 ends the processings of both of the voice transmission block 0303 and the voice receiving block 0304 (steps 1020 and 1021), then transmits a voice session end permission to the remote terminal unit through the communication control/input/output device and the network (step 1022). The voice session ending method regulated by the RFC2543 may also be used as the procedure to request such a voice session end permission.

After that, the session control block 0302 determines whether or not it has received a hand-writing start request from the remote terminal unit through the communication control/input/output device and the network (step 1023). If the determination result is YES (received), the session control block 0302 further determines whether or not the remote terminal unit can transmit handwritten data without user's permission (step 1024). This determination is realized, for example, by registering addresses for which no permission is required as a list in the primary or secondary storage device beforehand so as to check whether or not a remote terminal that is a hand-writing session start request source is registered in the list as needed. In this connection, if a remote terminal unit that has transmitted a hand-writing session start request is registered in the list, the session control block 0302 determines that the remote terminal unit can transmit handwritten data without user's permission and if the remote terminal unit is not registered in the list, the session control block 0302 determines that the remote terminal unit cannot transmit any handwritten data without user's permission.

And, if the determination result in step 1024 is NO (not transmit), the session control block 0302 requests the user to confirm the start of the hand-writing session (step 1025). To request the user to confirm the start of the hand-writing session in this case, it is also possible to display a screen on the display device to prompt the user to permit the start of the hand-writing session, thereby the user can input necessary data on the screen through the setting data input device to transmit permission or rejection of the start of the hand-writing session to the terminal unit that is the hand-writing session start request source, that is, the remote terminal unit that has requested the handwritten data communication.

Now, return to the description for the session control block 0302 shown in FIGS. 8 and 26 again. The session control block 0302 determines whether or not the start of the hand-writing session is permitted by the user in step 1025 (step 1026). If the determination result is YES (permitted), the session control block 0302 starts up the handwritten data control block 0311 (step 1027), then transmits the hand-writing session start permission to the remote terminal unit through the communication control/input/output device and the network (step 1028). The data session starting method regulated by the RFC2543 may also be used as the procedure to request such a hand-writing session start and obtain such a hand-writing session start permission.

On the other hand, if the determination result is NO (rejected), the session control block 0302 does not start up the handwritten data control block 0311 nor transmit the hand-writing session start permission to the remote terminal unit.

If the session control block 0302 determines in step 1024 that the remote terminal unit can transmit handwritten data without user's permission, the session control block 0302 starts up the handwritten data control block 0311 (step 1027) without requesting the user to confirm the start of the hand-writing session and determining that the start of the session is permitted according to the confirmation information. The session control block 0302 then transmits the hand-writing session start permission to the remote terminal unit through the communication control/input/output device and the network (step 1028).

After that, the session control block 0302 determines whether or not it has received a hand-writing session end request from the remote terminal unit through the communication control/input/output device and the network (step 1029). If the determination result is YES (received), the session control block 0302 ends the processing of the handwritten data control block 0311 (step 1030), then transmits the hand-writing session end permission to the remote terminal unit through the communication control/input/output device and the network (step 1031). The data session ending method regulated by the RFC2543 may also be used as the procedure to obtain such a hand-writing session end permission.

The session control block 0302 then determines whether or not it has received an image transmission session start request from the remote terminal unit through the communication control/input/output device and the network (step 1032). If the determination result is YES (received), the session control block 0302 further determines whether or not the remote terminal can transmit image data without user's permission (step 1033). This determination is realized, for example, by registering addresses for which no permission is required as a list in the primary or secondary storage device beforehand so as to check whether or not a remote terminal that is an image transmission session start request source is registered in the list. In this connection, if a remote terminal unit that has transmitted an image transmission session start request is registered in the list, the session control block 0302 determines that there is no need to obtain user's permission and if the remote terminal unit is not registered in the list, the session control block 0302 determines that there is a need to obtain user's permission. In this connection, the list of addresses that require no user's permission may be identical to that used in the above case in which a hand-writing session start request is received.

If the session control block 0302 determines in step 1033 that there is a need to obtain user's permission, the session control block 0302 requests the user to confirm the start of the image transmission session (step 1034). To request the user to confirm the start of the image transmission session in this case, it is also possible to display a screen on the display device to prompt the user to permit the start of the image transmission session, thereby the user can input necessary data on the screen through the setting data input device to transmit permission or rejection for the start of the image transmission session to the terminal unit that is the image transmission session start request source, that is, the remote terminal unit.

Now, return to the description for the session control block 0302 with reference to FIGS. 8 and 26. The session control block 0302 determines whether or not the start of the image transmission session is permitted by the user in step 1034 (step 1035). If the determination result is YES (permitted), the session control block 0302 starts up the image data receiving control block 0308 (step 1036), then transmits the image transmission session start permission to the remote terminal through the communication control/input/output device and the network (step 1037). The data session starting method regulated by the RFC2543 may also be used as the procedure to request the image transmission session start and obtain the image transmission session start permission.

On the other hand, if the determination result is NO (rejected), the session control block 0302 does not start up the image data receiving control block 0308 nor transmit the image transmission start permission to the remote terminal unit.

If the session control block 0302 determines in step 1033 that the remote terminal unit can transmit image data without user's permission, the session control block 0302 goes to step 1036 without requesting the user to confirm the start of the image transmission session nor determining whether or not the session start is permitted according to this confirmation, then starts up the image data receiving control block 0308 (step 1036) and transmits the image transmission start permission to the remote terminal unit through the communication control/input/output device and the network (step 1037).

After that, the session control block 0302 determines whether or not it has received an image transmission session end request from the image data transmission control block 0305 (step 1038). If the determination result is YES (received), the session control block 0302 ends the processing of the image data transmission control block 0305 (step 1039), then transmits an image transmission session end notice to the remote terminal unit through the communication control/input/output device and the network (step 1040). The data session ending method regulated by the RFC2543 may also be used as the procedure to transmit the image transmission session end notice.

The session control block 0302 then determines whether or not it has received an erasure request from the remote terminal unit through the communication control/input/output device and the network (step 1041). If the determination result is YES (received), the session control block 0302 further determines if the remote terminal unit can erase the data displayed in the handwritten data input/display area 0404 without user's permission (step 1042). This determination is realized, for example, by registering addresses for which no user's permission is required as a list and stored in the primary or secondary storage device beforehand so as to check whether or not the erase request source remote terminal is registered in the list. In this connection, if the request source remote terminal unit is registered in the list, the session control block 0302 determines that there is no need to require user's permission and if the remote terminal unit is not registered in the list, the session control block 0302 determines that there is a need to require user's permission. This list of addresses for which no user's permission is required may be identical to that used in the above case in which a hand-writing session start request or image transmission start request is received.

However, if the determination result in step 1042 is NO (cannot be erased), the session control block 0302 requests the user to confirm the erasure (step 1043). This confirmation may also be done as follows; the block 0302 displays a message on the display device of the request source remote terminal to prompt the user to permit or reject the erasure of the data from the handwritten data input/display area 0404.

Now, return to the description for the session control block 0302 with reference to FIGS. 8 and 26. The session control block 0302 determines whether or not erasure of the data displayed in the handwritten data input/display area 0404 is permitted by the user according to the confirmation result in step 1043 (step 1044). If the determination result is YES (permitted), the session control block 0302 starts up the erasing/information receiving block 0315 (step 1045), then transmits an erasure permission notice to the remote terminal unit through the communication control/input/output device and the network (step 1046). The data session starting method regulated by the RFC2543 may also be used as the procedure to request the erasure and transmit the erasure permission.

On the other hand, if the determination result is NO (rejected), the session control block 0302 does not start up the erasing/information receiving block 0315 nor transmit the erasure permission notice to the remote terminal unit.

However, if the session control block 0302 determines that the remote terminal unit can erase the data displayed in the handwritten data input/display area 0404 without user's permission as a result of the determination in step 1042, the session control block 0302 starts up the erasing/information receiving block 0315 without requesting the user to confirm the erasure nor determining whether or not the erasure is permitted by the user according to the determination result (step 1045), then transmits an erasure permission notice to the remote terminal unit through the communication control/input/output device and the network (step 1046).

The session control block 0302 then determines whether or not it has received an erasure end request from the erasing/information transmission block 0314 (step 1047). If the determination result is YES (received), the session control block 0302 ends the processing of the erasing/information transmission block 0314 (step 1048), then transmits an erasure end notice to the remote terminal unit through the communication control/input/output device and the network (step 1049). The data session ending method regulated by the RFC2543 may also be used as the procedure to notify the erasure end.

After that, the session control block 0302 determines whether or not it has received a voice session start permission from the remote terminal unit through the communication control/input/output device and the network (step 1050). If the determination result is YES (received), the session control block 0302 starts up both of the voice transmission block 0303 and the voice receiving block 0304 (step 1051, step 1052). The data session starting method regulated by the RFC2543 may also be used as the procedure to permit the start of the voice session.

The session control block 0302 then determines whether or not it has received a voice session end permission from the remote terminal unit through the communication control/input/output device and the network (step 1053). If the determination result is YES (received), the session control block 0302 ends the processings of both of the voice transmission block 0303 and the voice receiving block 0304 (step 1054, step 1055). The data session ending method regulated by the RFC2543 may also be used as the procedure to permit the end of the voice session.

After that, the session control block 0302 determines whether or not it has received a hand-writing session start permission from the remote terminal unit through the communication control/input/output device and the network (step 1056). If the determination result is YES (received), the session control block 0302 starts up the handwritten data control block 0311 (step 1057). The data session starting method regulated by the RFC2543 may also be used as the procedure to permit the start of the hand-writing session.

The session control block 0302 then determines whether or not it has received a hand-writing session end permission from the remote terminal unit through the communication control/input/output device and the network (step 1058). If the determination result is YES (received), the session control block 0302 ends the processing of the handwritten data control block 0311 (step 1059). The data session ending method regulated by the RFC2543 may also be used as the procedure to permit the end of the hand-writing session.

After that, the session control block 0302 determines whether or not it has received an image transmission session start permission from the remote terminal unit through the communication control/input/output device and the network (step 1060). If the determination result is YES (received), the session control block 0302 starts up the image data transmission control block 0305 (step 1061). The data session starting method regulated by the RFC2543 may also be used as the procedure to permit the start of the image transmission session.

Then, the session control block 0302 determines whether or not it has-received an image transmission session ending permission from the remote terminal through the communication control/input/output device and the network (step 1062). If the determination result is YES (received), the session control block 0302 ends the processing of the image data receiving control block 0308 (step 1063). The data session ending method regulated by the RFC2543 may also be used as the procedure to permit the end of the image transmission session.

The session control block 0302 then determines whether it has received an erasure permission from the remote terminal through the communication control/input/output device and the network (step 1064). If the determination result is YES (received), the session control block 0302 starts up the erasing/information transmission block 0314 (step 1065). The data session starting method regulated by the RFC2543 may also be used as the procedure to permit the erasure from the remote terminal unit.

After that, the session control block 0302 determines whether or not it has received an erasure end notice from the remote terminal through the communication control/input/output device and the network (step 1066). If the determination result is YES (received), the session control block 0302 ends the processing of the erasing/information receiving block 0315 (step 1067). The data session ending method regulated by the RFC2543 may also be used as the procedure to transmit the erasure end notice from the remote terminal unit.

Then, the session control block 0302 determines whether or not the processing of the session control block 0302 is ended by the input processing block 0301 (step 1068). If the determination result is NO (not ended), the session control block 0302 returns to step 1001 to repeat the processings 1001 to 10068 until the processing of the session control block 0302 is ended by the input processing block 0301.

On the other hand, if the determination result is YES (ended), the session control block 0302 closes all the sessions opened at that time (step 1069), then ends its own processing.

When a voice session is to be started by the session control block 0302, a screen for prompting user's permission to the voice session is displayed unconditionally. On the other hand, if a hand-writing session or image transmission session is to be started from a remote terminal unit that is not registered in the list of addresses that require no user's permission, as well as if an erasure processing is to be executed, a screen for prompting user's permission to each of the sessions comes to be displayed. In other words, handwritten data transmission, image data transmission, and data erasure can be made freely from any remote terminal unit registered in the list of addresses that require no user's permission, thereby the user can reply on each remote terminal unit registered in the list to have messages and such images as photos edited and transmitted to him/her even at his/her absence. It is also possible to end only a voice session to transmit very private contents only with image data and handwritten data through the session control block 0302 while image data and handwritten data are transmitted/received. Consequently, the processing load of the terminal unit involving in the voice communication is reduced, thereby transmission/receiving of image data and handwritten data is made smoothly even in a low through-put terminal unit.

In this embodiment, the system is configured so that if a remote terminal unit requests ending of a voice session, the session control block 0302 comes to end the voice session unconditionally. However, the system may also be configured as follows, for example. When receiving a voice session end request from a remote terminal unit, the session control block 0302 determines whether or not an image transmission session or hand-writing session is done in the self terminal unit. If the determination result is YES (done), the session control block 0302 displays a screen for prompting the user to permit the end of the voice session. And, if the user of the terminal unit that has received a voice session end request permits the end of the voice session, the session control block 0302 comes to end the voice session. Consequently, it is avoided to end such a voice session according to an arbitrary request from a remote terminal unit during a communication of image data or handwritten data. In addition, while the voice session start request receiving terminal unit, when receiving the request, displays a screen for prompting the user to confirm the permission of the voice session to obtain the user's permission for start of the voice session, then starts up both of the voice transmission block 0303 and voice receiving block 0304 in the above description, the system may also process the session just like any of the handwritten session, the image transmission session, and the erasure session. In other words, the system may be configured to process the request as follows. The voice session start request receiving side terminal unit, when receiving this voice session start request, determines whether or not the address of the request source terminal unit is registered in the list of addresses that require no user's permission. And, if the determination result is NO (not registered), the session control block 0302 displays a screen for prompting the user to confirm the permission for starting the voice session and determines whether or not the user has permitted the start of the voice session. If the determination result is YES (registered), the session control block 0302 displays a screen for permitting the start of the voice session and omits the confirmation of the voice session start and determination of whether or not the start of the voice session is permitted. In this connection, even when the address of the request source terminal unit is registered in the list of addresses that require no user's permission, the receiving side terminal unit should not start up the voice transmission block 0303. When ending the voice session, the receiving side terminal unit should end the processing of only the voice receiving block 0304 and suppress the display of the screen for permitting the end of the voice session so as to omit the permission for ending the voice session from the receiving side user. Consequently, the receiving side user can receive voices freely from reliable remote terminals to receive announcements, etc., so that the request source terminal unit can make such announcements. Even in such a case, conversations and ambient sounds can be prevented from hidden listening devices.

Next, a description will be made for the processings of the voice transmission block 0303 started and ended by the voice transmission block 0303 and executed under the control of the CPU during the while. The voice transmission block 0303 is configured as a task separately from those of other software components and executed by the CPU in parallel to the tasks of those other software components.

At first, the voice transmission block 0303 obtains voice data from the voice input device (step 1701), then encodes the voice data (step 1702). The encoding method may be, for example, the G.711 method recommended by the ITU-T.

Then, the voice transmission block 0303 packets the encoded voice data (step 1703) and the session control block 0302 transmits the packet to the remote terminal in which a voice session is started through the communication control/input/output device and the network (step 1704). A method regulated by the RFC2543 may be used for packetizing the voice data. A well-known IP header or TCP header may be added to the voice data at this time to form the packet as a TCP/IP packet.

After that, the voice transmission block 0303 determines whether or not its processing is ended by the session control block 0302 (step 1705). If the determination result is NO (not ended), the voice transmission block 0303 returns to step 1701 to repeat the processings in steps 1701 to 1705 until its processing is ended by the session control block 0302.

On the other hand, if the determination result in step 1705 is YES (ended), the voice transmission block 0303 ends its processing.

Next, a description will be made for the processings of the voice receiving block 0304 started and ended by the session control block 0302 and executed under the control of the CPU during the while. The voice receiving block 0304 is configured as a task separately from those of other software components and executed by the CPU in parallel to the tasks of those other components.

At first, the voice receiving block 0304 receives encoded packet voice data from the remote terminal unit in which a voice session is already started by the session control block 0302 through the communication control/input/output device (step 1801), then obtains encoded voice data from the received packet (step 1802).

The voice receiving block 0304 then decodes the voice data (step 1803) and outputs the decoded voice data through the voice output device (step 1804).

After that, the voice receiving block 0304 determines whether or not its processing is ended by the session control block 0302 (step 1805). If the determination result is NO (not ended), the voice receiving block 0304 returns to step 1801 to repeat the processings in steps 1801 to 1805 until the processing is ended by the session control block 0302.

On the other hand, if the determination result is YES (ended), the voice receiving block 0304 ends its processing.

Figure 9:
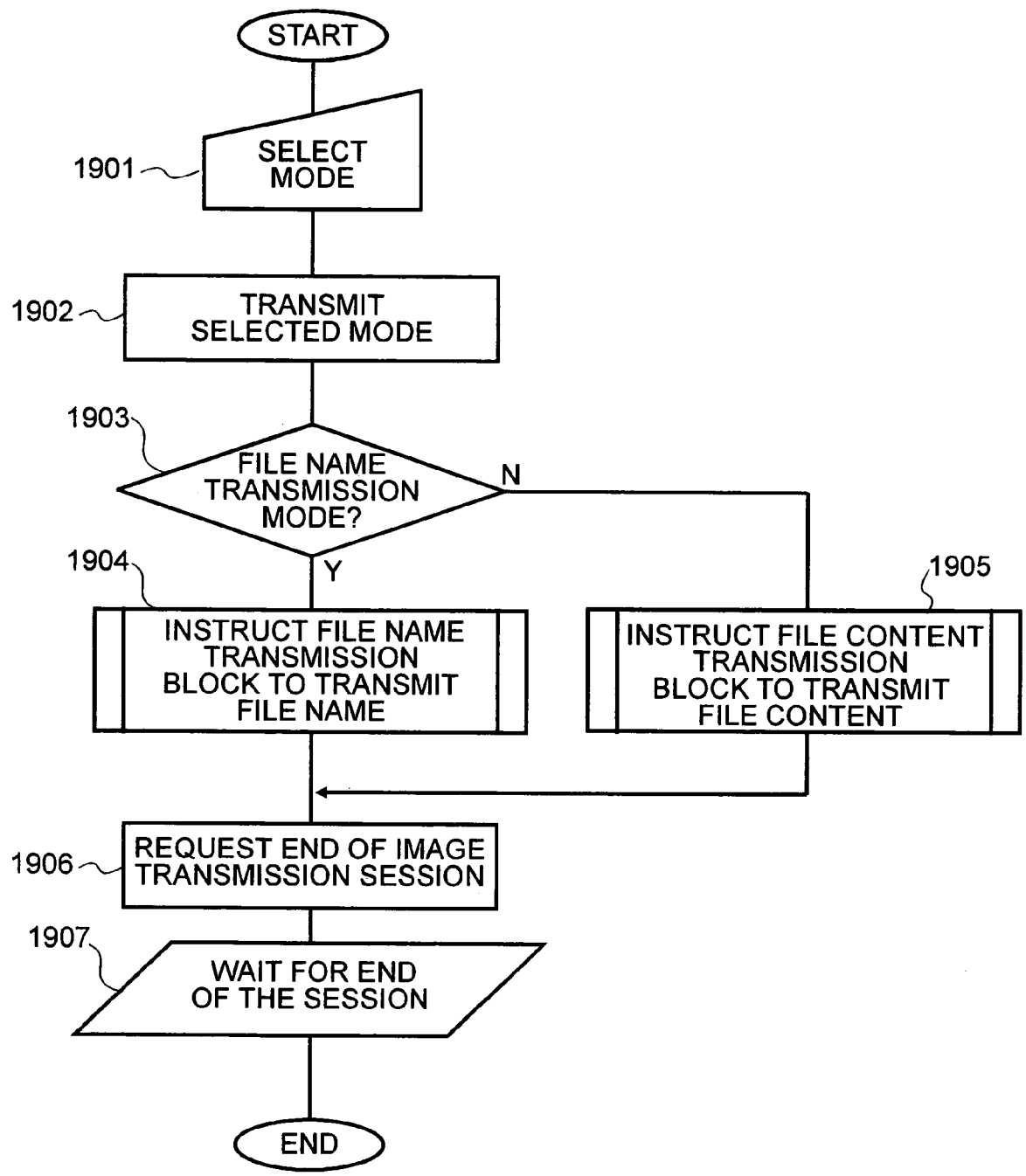
FIG. 9 is a flowchart of the processings of an image data transmission control block provided in the terminal unit of the communication system in the embodiment of the present invention.

Next, a description will be made for the processings of the image data transmission control block 0305 started and ended by the session control block 0302 and executed under the control of the CPU during the while similarly to the above components with reference to FIG. 9. FIG. 9 shows a flowchart of the processings of the image data transmission control block 0305. The image data transmission control block 0305 is configured as a task separately from those of other software components and executed by the CPU in parallel to the tasks of those other components.

As shown in FIG. 9, the image data transmission control block 0305, when it is started up, displays the image transmission selection screen 0600 for prompting the user to select an image transmission mode (file name transmission mode or file content transmission mode) for transmitting image data on the display device, then waits for user's specification of a mode (step 1901).

The image data transmission control block 0305 then transmits the user-specified image transmission mode to the remote terminal unit through the communication control/input/output device and the network (step 1902).

After that, the image data transmission control block 0305 determines whether the user-specified mode is the file name transmission mode or file content transmission mode (step 1903). If the file name transmission mode is specified, the image data transmission control block 0305 starts up the file name transmission block 0306 (step 1904). If the file content transmission mode is specified, the image data transmission control block 0305 starts up the file content transmission block 0307 (step 1905).

After completing the processing of the file name transmission block 0306 or file content transmission block 0307, the image data transmission control block 0305 requests the session control block 0302 of the self terminal unit to end the image transmission session (step 1906). Instead of the request to end the image transmission session, the block 0305 may issue an event denoting an image transmission session end request to the session control block 0302.

After that, the image data transmission control block 0305 waits until its processing is ended by the session control block 0302 (step 1907), then ends its processing.

Figure 10:
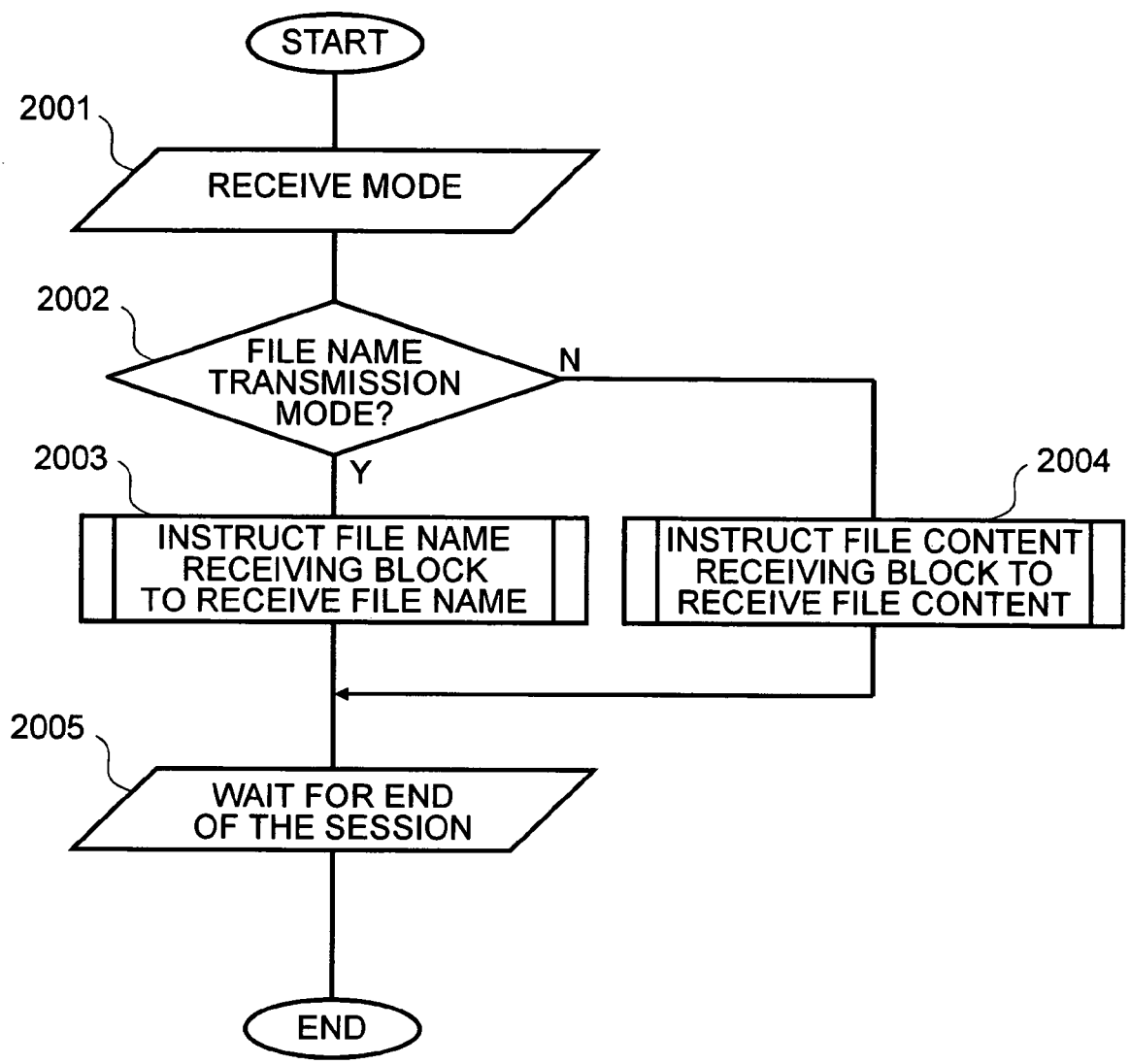
FIG. 10 is a flowchart of the processings of an image data receiving control block provided in the terminal unit of the communication system in the embodiment of the present invention.

Next, a description will be made for the processings of the image data receiving control block 0308 started and ended by the session control block 0302 and executed under the control of the CPU during the while with reference to FIG. 10. FIG. 10 shows a flowchart of the processings of the image data receiving control block 0308. The image data receiving control block 0308 is configured as a task separately from those of other software components and executed under the control of the CPU in parallel to the tasks of those other components.

As shown in FIG. 10, the image data receiving control block 0308, when it is started up, receives the user-specified image transmission mode from the remote terminal unit through the communication control/input/output device and the network (step 2001).

The image data receiving control block 0308 then determines whether the received image transmission mode is the file name transmission mode or file content transmission mode (step 2002). If the file name transmission mode is specified, the image data receiving control block 0308 starts up the file name receiving block 0309 (step 2003).

On the other hand, if the file content transmission mode is specified, the image data receiving control block 0308 starts up the file content receiving block 0310 (step 2004).

After completing the execution of the file name receiving block 0309 or file content receiving block 0310, the image data receiving control block 0308 waits, then its processing is ended by the session control block 0302 (step 2005). (When its processing is ended by the session control block 0302, the image data receiving control block 0308 ends its processing.)

Figure 11:
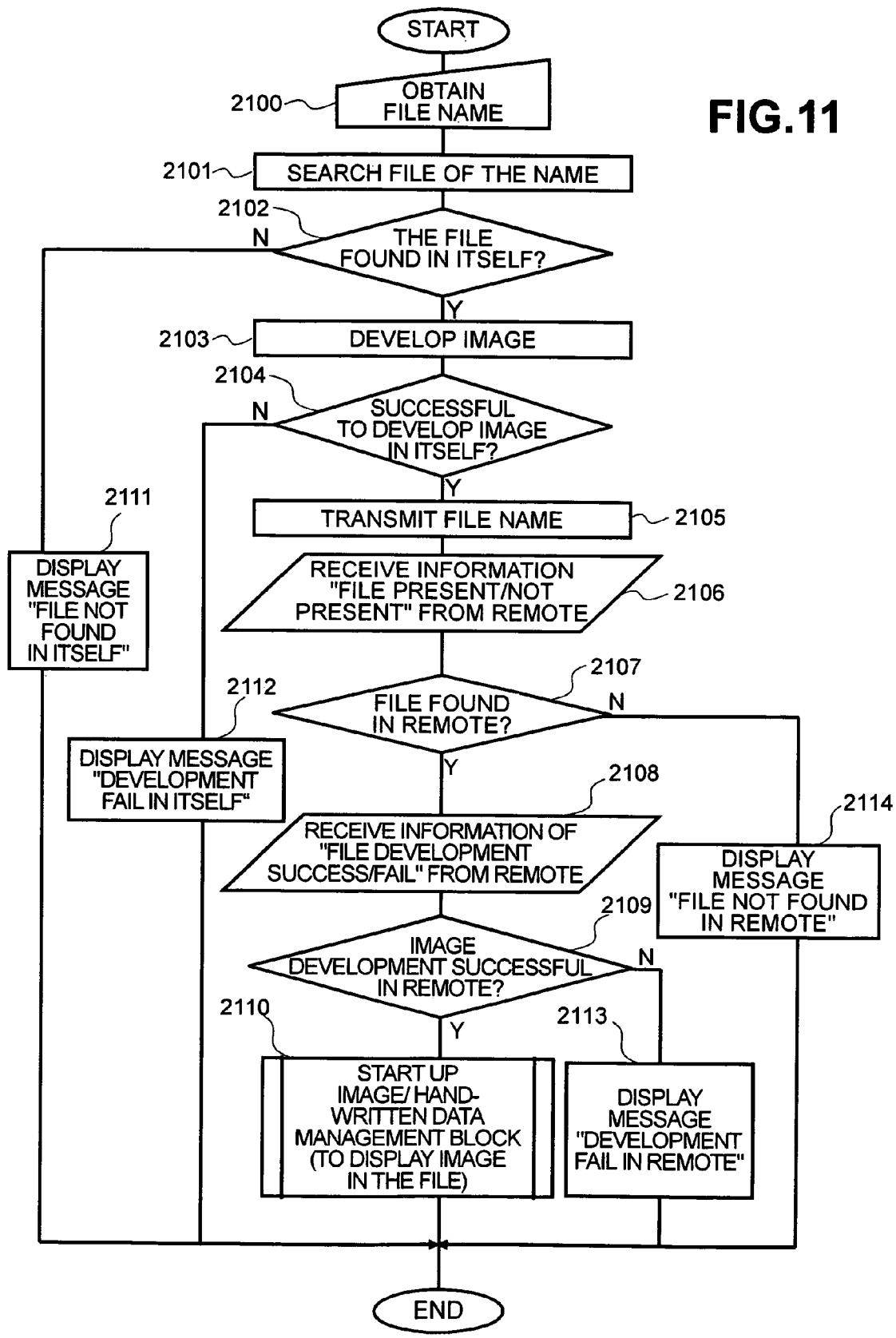
FIG. 11 is a flowchart of the processings of a file name transmission block provided in the terminal unit of the communication system in the embodiment of the present invention.

Next, a description will be made for the processings of the file name transmission block 0306 started and ended by the image data transmission control block 0305 and executed under the control of the CPU during the while with reference to FIG. 11. FIG. 11 shows a flowchart of the processings of the file name transmission block 0306.

As shown in FIG. 11, the file name transmission block 0306 receives an image file name inputted by the user (step 2100), then searches the file of the received file name in the primary or secondary storage device of the self terminal unit (step 2101).

The file name transmission block 0306 then determines whether or not the file exists in the self terminal unit (storage device) according to the result of the searching in step 2101 (step 2102). If the determination result is NO (not exist), the file name transmission block 0306 displays the "not found" message on the display device (step 2111), then the file name transmission block 0306 ends its processing.

On the other hand, if the determination result is YES (exist), the file name transmission block 0306 develops the image data in the file (step 2103), then determines whether or not the image data is developed successfully (step 2104). The "development" mentioned here means to obtain image data from a file and enable the image data to be displayed on the display device any time.

The file name transmission block 0306, when determining in step 2104 that developing of the image data has failed, displays the failure message on the display device (step 2112), then ends its processing.

On the other hand, when determining that the development of the image data is successful, the file name transmission block 0306 transmits the user-inputted file name to the remote terminal through the communication control/input/output device and the network (step 2105).

After that, the file name transmission block 0306 receives file existence information from the remote terminal unit (step 2106) to determine whether or not the specified file exists in the remote terminal unit (step 2107).

If the determination result is NO (not found), the file name transmission block 0306 displays the "not found" message on the display device (step 2114) and ends its own processing.

On the other hand, if the determination result is YES (found), the file name transmission block 0306 receives file development information denoting whether or not the image data of the specified file is developed successfully in the remote terminal unit (step 2108).

The file name transmission block 0306 then determines whether or not the image data of the file is developed in the remote terminal unit (step 2109). If the determination result is NO (not developed), the file name transmission block 0306 displays the "fail" message on the display device (step 2113) and ends its own processing.

On the other hand, if the determination result is YES (developed), the file name transmission block 0306 starts up the image/handwritten data management block of the remote terminal unit and instructs the management block to display the image data developed in step 2103 and (step 2110), then ends its own processing.

Figure 12:
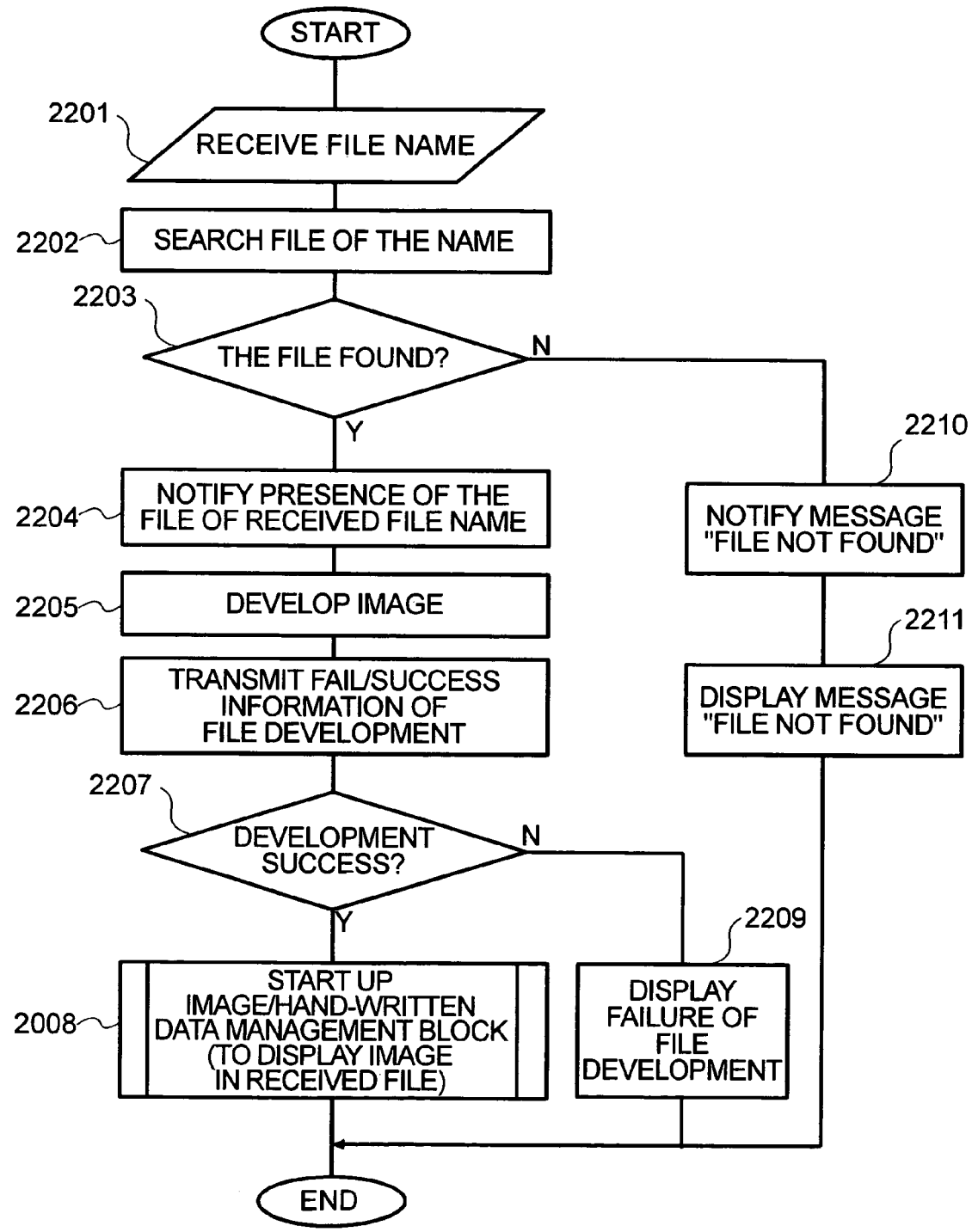
FIG. 12 is a flowchart of the processings of a file name receiving block provided in the terminal unit of the communication system in the embodiment of the present invention.

Next, a description will be made for the processings of the file name receiving block 0309 started and ended by the image data receiving control block 0308 and executed under the control of the CPU during the while with reference to FIG. 12. FIG. 12 shows a flowchart of the processings of the file name receiving block 0309.

As shown in FIG. 12, the file name receiving block 0309 receives the name of a file that includes image data to be displayed from the remote terminal unit through the communication control/input/output device and the network (step 2201).

The file name receiving block 0309 then searches the file of the name received in step 2201 in its terminal unit, for example, in the secondary or primary storage device (step 2202) and determines whether or not the file exists in its terminal unit according to the searching result (step 2203).

If the determination result is NO (not found), the file name receiving block 0309 transmits the result (not found) to the remote terminal unit as file existence information, then displays the result (not found) on the display device of the self terminal unit (step 2211), then ends its own processing.

On the other hand, if the determination result in step 2203 is YES (found), the file name receiving block 0309 transmits the result (found) to the remote terminal as file existence information (step 2204), then develops the image data in the file (step 2205) and transmits the file development information denoting whether or not the image data in the file is developed successfully to the remote terminal (step 2206).

After that, the file name receiving block 0309 determines whether or not the image data is developed successfully in step 2205 (step 2207). If the determination result is NO (fail), the file name receiving block 0309 displays the "fail" message on the display device (step 2209), then ends its own processing.

On the other hand, if the determination result is YES (successful), the file name receiving block 0309 starts up the image/handwritten data management block and instructs the management block to display the image data developed in step 2205 (step 2208), then ends its own processing.

Figure 13:
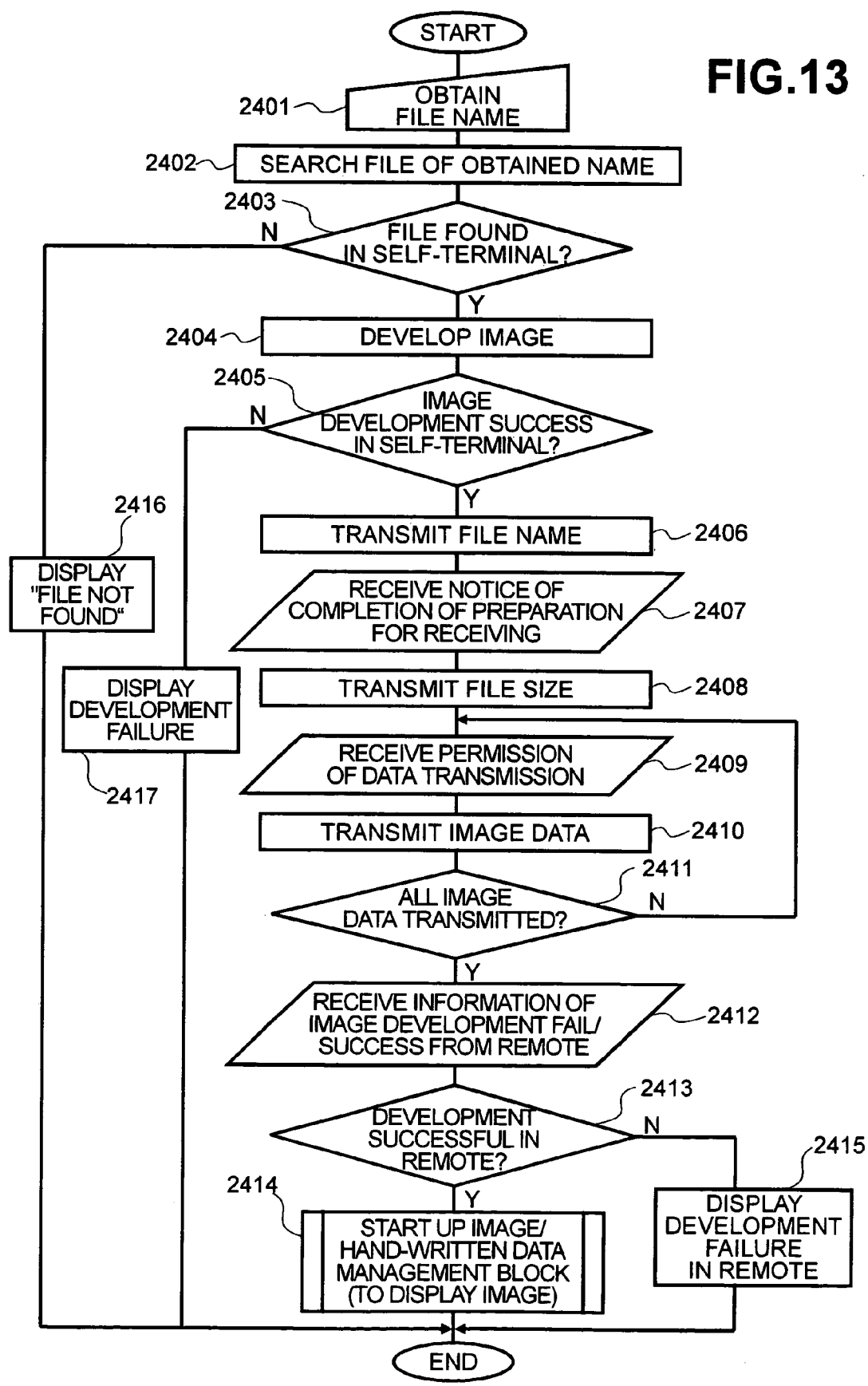
FIG. 13 is a flowchart of the processings of a file content transmission block provided in the terminal unit of the communication system in the embodiment of the present invention.

Next, a description will be made for the processings of the file content transmission block 0307 started and ended by the image data transmission control block 0305 and executed under the control of the CPU during the while with reference to FIG. 13. FIG. 13 shows a flowchart of the processings of the file content transmission block 0307.

As shown in FIG. 13, the file content transmission block 0307 receives a file name inputted by the user (step 2401). The file includes image data to be transmitted. Then, the file content transmission block 0307 searches the file in its terminal unit according to the received file name, for example, in the secondary or primary storage device (step 2402).

After that, the file content transmission block 0307 determines whether or not the file exists in the self terminal unit according to the result of the searching in step 2402 (step 2403). If the determination result is NO (not found), the file content transmission block 0307 displays the "not found" message on the display device (step 2416), then ends its own processing.

On the other hand, if the determination result is YES (found), the file content transmission block 0307 develops the image data in the file (step 2404) and determines whether or not the image data in the file is developed successfully in the self terminal unit (step 2405).

If the determination result is NO (fail), the file content transmission block 0307 displays the "fail" message on the display device (step 2417), then ends its processing.

On the other hand, if the determination result in step 2403 is YES (successful), the file content transmission block 0307 transmits the file name inputted by the user in step 2401 to the remote terminal unit in which an image transmission session is already started by the session control block 0302 through the communication control/input/output device and the network (step 2406).

After that, the file content transmission block 0307 receives a notice denoting that the remote terminal is ready to receive data from the remote terminal (step 2407), then transmits the file size to the remote terminal unit (step 2408).

The file content transmission block 0307 then receives a notice denoting that the remote terminal has permitted data transmission from the remote terminal unit (step 2409), then transmits the file content specified by the user in step 2401, that is, image data, to the remote terminal unit (step 2410).

Then, the file content transmission block 0307 determines whether or not all the file contents, that is, all the image data have been transmitted (step 2411). If the determination result is NO (not transmitted), the file content transmission block 0307 repeats the processings in steps 2409 to 2411 until the image data is transmitted completely. Consequently, it is possible here to divide a file into some pieces and transmit the divided pieces to the remote terminal unit one by one in response to each data transmission enable signal from the remote terminal unit. Image data can thus be transmitted in accordance with the receiving states of the remote terminal unit and the communication band in use. It is also possible to know whether or not the target image data is transmitted completely by checking whether or not the file size notified to the remote terminal unit in step 2408 is reached in the transmission.

If the determination result in step 2411 is YES (transmitted), the file content transmission block 0307 receives information denoting whether or not the image data is developed successfully in the remote terminal unit (step 2412).

The file content transmission block 0307 then determines whether or not the image data is developed successfully in the remote terminal unit according to the image development success/fail information received in step 2412 (step 2413). If the determination result is NO (fail), the file content transmission block 0307 displays the "fail" message on the display device (step 2415), then ends its own processing.

On the other hand, if the determination result in step 2413) is YES (successful), the file content transmission block 0307 starts up the image/handwritten data management block and instructs the management block to display the image data developed in step 2404 (step 2414), then ends its processing.

Figure 14:
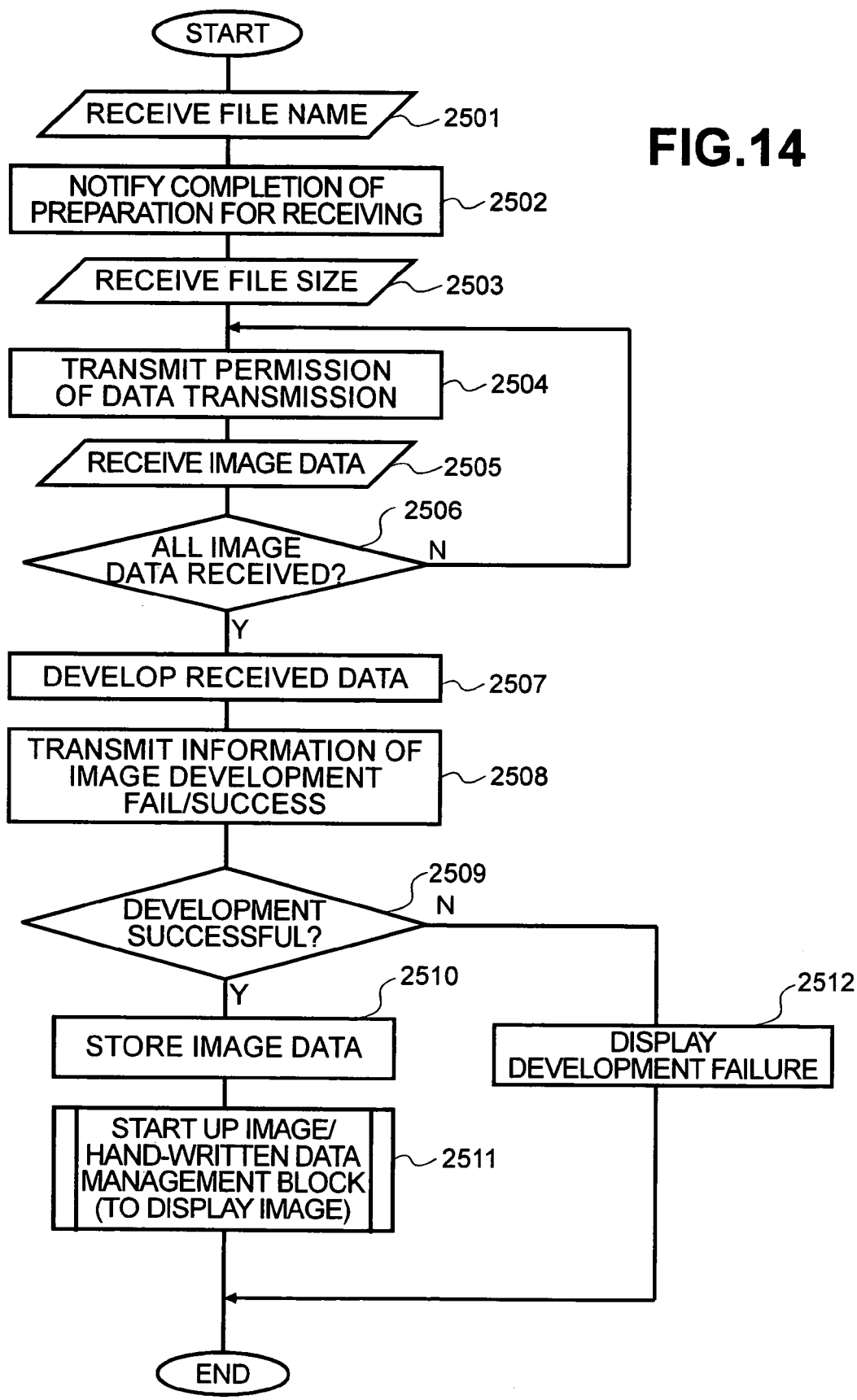
FIG. 14 is a flowchart of the processings of a file content receiving block provided in the terminal unit of the communication system in the embodiment of the present invention.

Next, a description will be made for the processings of the file content receiving block 0310 started and ended by the image data receiving control block 0308 and executed under the control of the CPU during the while with reference to FIG. 14. FIG. 14 shows a flowchart of the processings of the file content receiving block 0310.

As shown in FIG. 14, the file content receiving block 0310 receives a file name from the remote terminal in which an image transmission session is already started by the session control block 0302, through the communication control/input/output device and the network (step 2501). The file includes image data to be displayed.

The file content receiving block 0310 then transmits a notice denoting it is ready to receive image data to the remote terminal unit (step 2502), then receives an image data size, that is, a file size from the remote terminal unit (step 2503).

After receiving the file size, the file content receiving block 0310 transmits a notice for permitting the remote terminal unit to transmit data to the block 0310 (step 2504).

After that, the file content receiving block 0310 receives the file content, that is, image data from the remote terminal unit (step 2505), then determines whether or not the file content, that is, the image data is received completely (step 2506). If the determination result is NO (not received), the file content receiving block 0310 repeats the processings in steps 2504 to 2506 until it completes receiving of all the image data. It is also possible here to know whether or not receiving of all the image data is completed by checking whether or not the file size notified from the remote terminal unit in step 2408 is reached in the transmission. Consequently, the terminal unit can divide a file into some pieces and transmit the divided file pieces to the remote terminal unit one by one in response to each data transmission enable signal in accordance with the receiving states of the remote terminal unit and the communication band in use.

If the determination result in step 2506 is YES (received), the file content receiving block 0310 develops the received image data (step 2507), then transmits development information denoting whether or not image data is developed successfully to the remote terminal unit (step 2508).

After that, the file content receiving block 0310 determines whether or not the image data is developed in step 2507 successfully (step 2509). If the determination result is NO (fail), the file content receiving block 0310 displays the "fail" message on the display device (step 2512), then ends its own processing.

On the other hand, if the determination result is YES (success), the file content receiving block 0310 stores the received image data in the primary or secondary storage device with the file name received in step 2501 (step 2510), then starts up the image/handwritten data management block and instructs the management block to display the image data developed in step 2507 on the display device (step 2511), then ends its processing.

Although received image data is stored in the primary or secondary storage device in this file content receiving block 0310, the data may not necessarily stored such way. In this connection, it is possible to suppress such a storing processing for the primary or secondary storage device provided in the file content receiving block 0310.

Furthermore, although a file having a specified file name is transmitted/received from/in the file content transmission block 0307 and the file content receiving block 0310 respectively in this embodiment, such a file may be replaced with the contents stored in a storage device. In this connection, the data may be that stored in a storage device at the transmission side and it is possible to suppress such processings to be executed in the file content transmission block 0307 as obtaining file names, searching files, transmitting/receiving file names and file sizes between the file content transmission block 0307 and the file content receiving block 0310.

As described above, basic image data can be communicated with different file names and the basic image data can be changed in contents for the communication while the matching among the basic image data is kept and the number of bands, as well as the processing amount required to transmit such image data can be reduced with use of the image data transmission control block 0305, the file name transmission block 0306, the file content transmission block 0307, the image data receiving control block 0308, the file name receiving block 0309, and the file content receiving block 0310.

Figure 15:
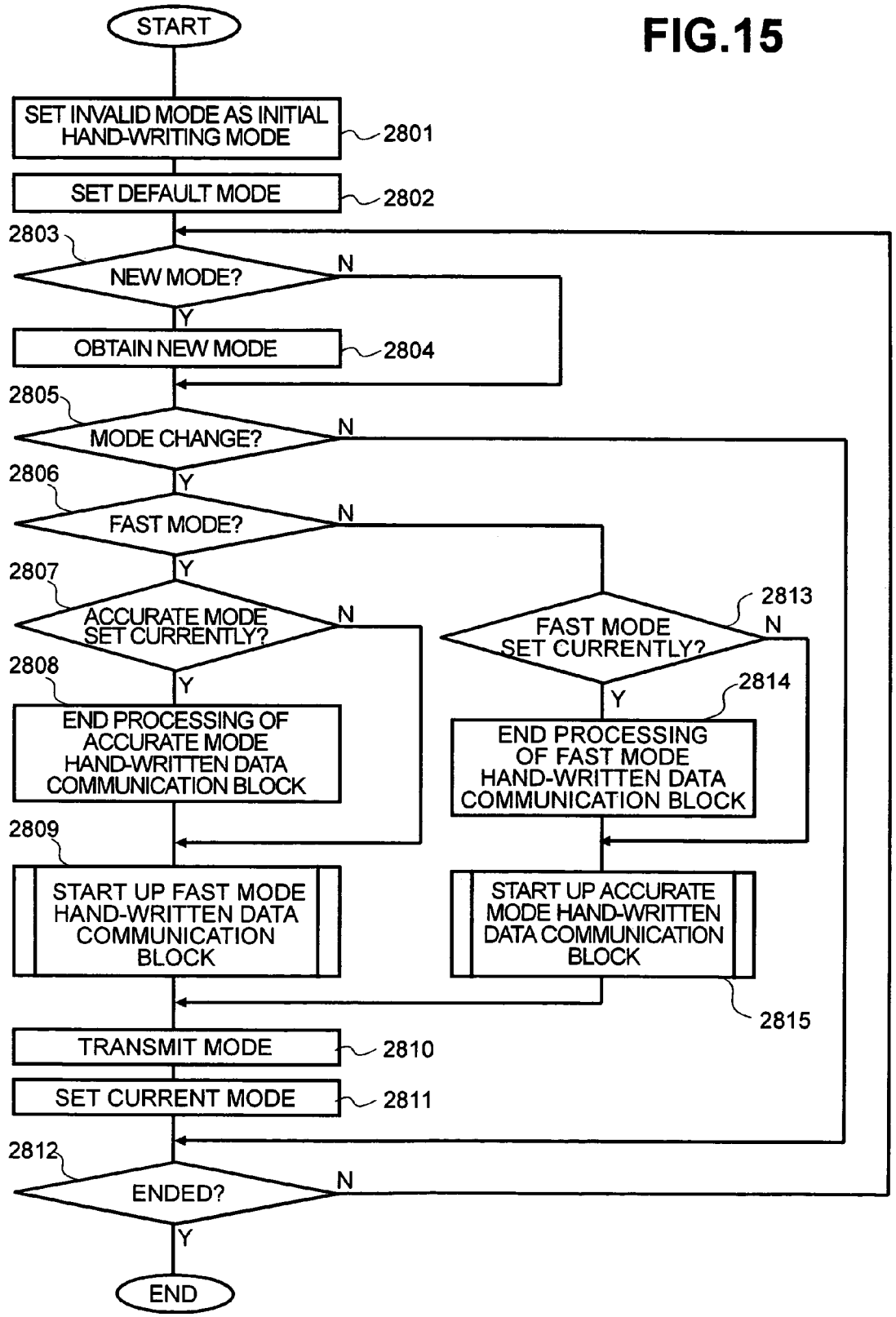
FIG. 15 is a flowchart of the processings of a handwritten data control block provided in the terminal unit of the communication system in the embodiment of the present invention.

Next, a description will be made for the processings of the handwritten data control block 0311 started and ended by the session control block 0302 and executed under the control of the CPU during the while with reference to FIG. 15. FIG. 15 shows a flowchart of the processings of the handwritten data control block 0311. The handwritten data control block 0311 is configured as a task separately from those of other software components and executed by the CPU in parallel to the tasks of those other software components.

As shown in FIG. 15, at first, the handwritten data control block 0311 sets an invalid handwritten mode as the current mode so that a default mode is set in the steps 2802 and 2805 as to be described later (step 2801).

The handwritten data control block 0311 then changes the mode to a default one (step 2802). This default mode may be any one that is often used by the user, for example, the fast mode.

After that, the handwritten data control block 0311 determines whether or not another hand-writing mode is set by the input processing block 0301 or received from the remote terminal unit (step 2803). If the determination result is YES (set or received), the handwritten data control block 0311 obtains the new mode (step 2804). This determination for whether or not a new mode is set by the input processing block 0301, as well as what is the new mode is also possible by checking whether or not an event denoting a new mode setting is received, for example, from the input processing block 0301 or checking a mode event corresponding to the user selected mode.

The handwritten data control block 0311 then determines whether or not any mode change is done between the new mode and the current mode (step 2805).

If the determination result is NO (not changed), the handwritten data control block 0311 goes to step 2812 to determine whether or not its processing is ended by the session control block 0302 (step 2812). If the determination result in step 2812 is NO (not ended), the handwritten data control block 0311 returns to step 2803. On the other hand, if the determination result in step 2812 is YES (ended), the handwritten data control block 0311 ends its processing. To end this handwritten data control block 0311, the processing of the fast mode handwritten data communication block 0312 or accurate mode handwritten data communication block 0313, if it is operating, must be ended.

On the other hand, if the determination result in step 2805 is YES (changed), the handwritten data control block 0311 further determines whether or not the new mode is the fast mode (step 2806).

If the determination result in step 2806 is YES (fast mode), the handwritten data control block 0311 further determines whether or not the current mode is the accurate mode (step 2807). If the determination result is YES (accurate mode), the handwritten data control block 0311 ends the processing of the accurate mode handwritten data communication block 0313 (step 2808), then starts up the fast mode handwritten data communication block 0312 (step 2809). On the other hand, if the determination result, in step 2807 is NO (not the accurate mode), the handwritten data control block 0311 starts up the fast mode handwritten data communication block 0312 (step 2809).

If the determination result in step 2806 is NO (not the fast mode), the handwritten data control block 0311 further determines whether or not the current mode is the fast mode (step 2813). If the determination result is YES, the handwritten data control block 0311 ends the processing of the fast mode handwritten data communication block 0312 (step 2814), then starts up the accurate mode handwritten data communication block 0313 (step 2815). On the other hand, if the determination result in step 2813 is NO (not the fast mode), the handwritten data control block 0311 starts up the accurate mode handwritten data communication block 0313 (step 2815).

After that, the handwritten data control block 0311 transmits the new mode to the remote terminal unit through the communication control/input/output device and the network (step 2810), then sets the new mode as the current one (step 2811). At this time, if the mode is changed to the new mode received from the remote terminal unit, the handwritten data control block 0311 omits the transmission of the new mode to the remote terminal unit in step 2810.

The accurate mode handwritten data communication block 0313 then determines whether or not the processing of the handwritten data control block 0311 is ended by the session control block 0302 (step 2812). If the determination result is NO (not ended), the accurate mode handwritten data communication block 0313 returns to step 2803. However, if the determination result in step 2812 is YES (ended), the accurate mode handwritten data communication block 0313 ends the processing of the handwritten data control block 0311. To end the processing of the handwritten data control block 0311, the processing of the fast mode handwritten data communication block 0312 or accurate mode handwritten data communication block 0313, if it is active, is ended.

Figure 16:
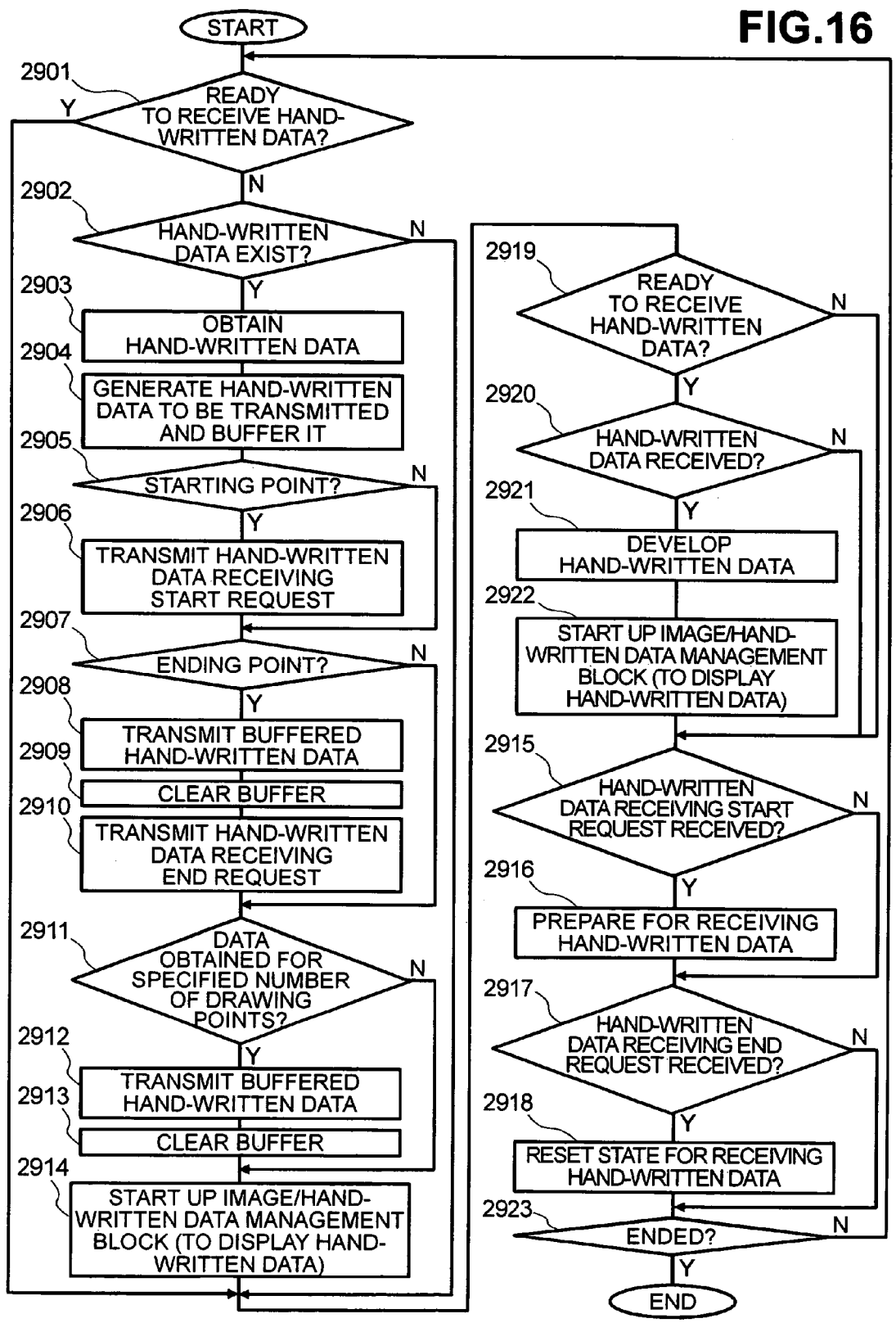
FIG. 16 is a flowchart of the processings of a fast mode handwritten data communication block provided in the terminal unit of the communication system in the embodiment of the present invention.

Next, a description will be made for the processings of the fast mode handwritten data communication block 0312 started up and ended by the handwritten data control block 0311 and executed under the control of the CPU during the while with reference to FIG. 16. FIG. 16 shows a flowchart of the processings of the fast mode handwritten data communication block 0312. The fast mode handwritten data communication block 0312 is configured as a task separately from those of other software components and executed by the CPU in parallel to the tasks of those other software components.

As shown in FIG. 16, at first, the fast mode handwritten data communication block 0312 determines whether or not it is set so as to receive handwritten data (step 2901). If the determination result is YES (set), the fast mode handwritten data communication block 0312 skips steps 2902 to 2914 to be described below.

On the other hand, if the determination result in step 2901 is NO (not set), the fast mode handwritten data communication block 0312 determines whether or not any handwritten data is inputted by the user through the handwritten data input device (step 2902). If the determination result is NO (not inputted), the fast mode handwritten data communication block 0312 skips steps 2903 to 2914 to be described below.

If the determination result in step 2902 is YES (inputted), the fast mode handwritten data communication block 0312 obtains the handwritten data inputted by the user through the input device (step 2903), generates handwritten data to be transmitted to the remote terminal unit, then buffers the generated data (step 2904).

The fast mode handwritten data communication block 0312 then determines whether or not the inputted handwritten data is a starting point of a line (step 2905). If the determination result is YES, the fast mode handwritten data communication block 0312 transmits a handwritten data receiving start request to the remote terminal unit (step 2906). The start request denotes the start of handwritten data.

After that, the fast mode handwritten data communication block 0312 determines whether or not the inputted handwritten data is an ending point of a line (step 2907). If the determination result is YES, the fast mode handwritten data communication block 0312 transmits the buffered handwritten data to the remote terminal unit (step 2908), then clears the buffer in which the handwritten data has been buffered (step 2909) and transmits a handwritten data receiving end request to the remote terminal unit. The end request denotes the end of the handwritten data transmission (step 2910).

The fast mode handwritten data communication block 0312 then determines whether or not handwritten data for a predetermined number of drawing points, for example, handwritten data for 10 points is already buffered (step 2911). If the determination result is YES (buffered), the fast mode handwritten data communication block 0312 transmits the buffered handwritten data to the remote terminal unit (step 2912), then clears the buffer (step 2913).

After that, the fast mode handwritten data communication block 0312 starts up the image/handwritten data management block 0316 to instruct the block 0316 to display the inputted handwritten data in the handwritten data input/display area 0404 of the display device (step 2914).

The fast mode handwritten data communication block 0312 then determines whether or not it is set so as to receive handwritten data (step 2919). If the determination result is YES (set), the fast mode handwritten data communication block 0312 further determines whether or not it receives any handwritten data from the remote terminal unit (step 2920). If the determination result is YES (received), the fast mode handwritten data communication block 0312 develops the received handwritten data (step 2921) and start up the image/handwritten data management block 0316 to instruct the block 0316 to display the developed handwritten data received from the remote terminal unit (step 2922). The "development" mentioned here means to convert received handwritten data to attribute or coordinate data of a starting or ending point, then obtain the line type to enable the data to be displayed on the display device.

After that, the fast mode handwritten data communication block 0312 determines whether or not it has received a handwritten data receiving start request from the remote terminal unit (step 2915). If the determination result is YES (received), the fast mode handwritten data communication block 0312 sets the self terminal unit ready to receive handwritten data (step 2916).

The fast mode handwritten data communication block 0312 then determines whether or not it has received a request of handwritten data receiving end from the remote terminal (step 2917). If the determination result is YES (received), the fast mode handwritten data communication block 0312 resets the state of the self terminal unit for receiving handwritten data (step 2918).

After that, the fast mode handwritten data communication block 0312 determines whether or not its processing is ended by the handwritten data control block 0311 (step 2923). If the determination result is NO (not ended), the communication block 0312 returns to step 2901 to repeat the processings in steps 2901 to 2923 until its processing is ended by the handwritten data control block 0311. On the other hand, if the determination result in step 2923 is YES (ended), the communication block 0312 ends its processing.

While the processings of the handwritten data control block 0311 have been described so far, according to the present invention, the control block 0311 can control so that when one of two terminal units begins hand-writing, the terminal unit is defined as the transmission side terminal unit while the other terminal unit is defined as the receiving side terminal unit. Consequently, it is prevented that both of the two terminal units input handwritten data simultaneously. And, while one of the two terminal units makes hand-writing, the hand-writing comes to have priority over that of the other, so that the communication between those two terminal units is made smoothly.

Next, a description will be made for the processings of the accurate mode handwritten data communication block 0313 started up and ended by the handwritten data control block 0311 under the control of the CPU during the while. The accurate mode handwritten data communication block 0313 is configured as a task separately from those of other software components and executed by the central processing unit (UNIT) in parallel to the tasks of those other software components.

The processings of this accurate mode handwritten data communication block 0313 are basically the same as those of the fast mode handwritten data communication block 0312 described with reference to FIG. 16. However, this accurate mode handwritten data communication block 0313 is controlled to wait for receiving a notice of handwritten data receiving/displaying end from the remote terminal unit after transmitting buffered handwritten data in steps 2908 to 2912. The notice denotes that receiving/displaying of the handwritten data is completed in the remote terminal unit.

The accurate mode handwritten data communication block 0313, after displaying received handwritten data in the handwritten data input/display area 0404 of the display device through the image/handwritten data management block 0316 in step 2922, is controlled to transmit a notice of handwritten data receiving/displaying end to the remote terminal.

Therefore, the transmission side terminal unit suppresses transmission of the next handwritten data until the receiving side terminal unit displays received handwritten data due to the processing of the accurate mode handwritten data communication block 0313, so that the receiving side terminal unit never cause such errors as missing of received data to be caused by buffer overflow even when the receiving side terminal unit takes much time for another processing. Thus, the same written-data is always displayed at both of the transmission and receiving sides, thereby the communication between those terminal units is made smoothly.

Although the fast mode handwritten data communication block 0312 and the accurate mode handwritten data communication block 0313 are provided as different processing blocks in this embodiment, they may be united into one as a handwritten data communication block. In this connection, it is just required that a flag is set for denoting selection of the fast mode instead of the processings in steps 2807 to 2809 while another flag is set for denoting selection of the accurate mode instead of the processings in steps 2813 to 2815 in FIG. 15. And, the handwritten data communication block formed by uniting the two blocks 0312 and 0313 may be configured so that a part for transmitting/receiving notices of handwritten data receiving/displaying end is branched according to the status of the above-described fast mode selection flag described above, thereby such a notice denoting an end of handwritten data receiving/displaying is transmitted/received only in the fast mode.

Because handwritten data is collected in chunks and a chunk of handwritten data is transmitted/received at each predetermined number of sampling times with use of the fast mode handwritten data communication block 0312, the accurate mode handwritten data communication block 0313, and the handwritten data control block 0311 described above, curved lines are drawn smoothly. And, because whether or not a notice is received is denoted alternately for each chunk of data between the subject terminal units, fast and accurate transmission/receiving of chunked data is assured, thereby high quality handwritten data communication is realized without increasing the through-put of each of the terminal units.

Figure 17:
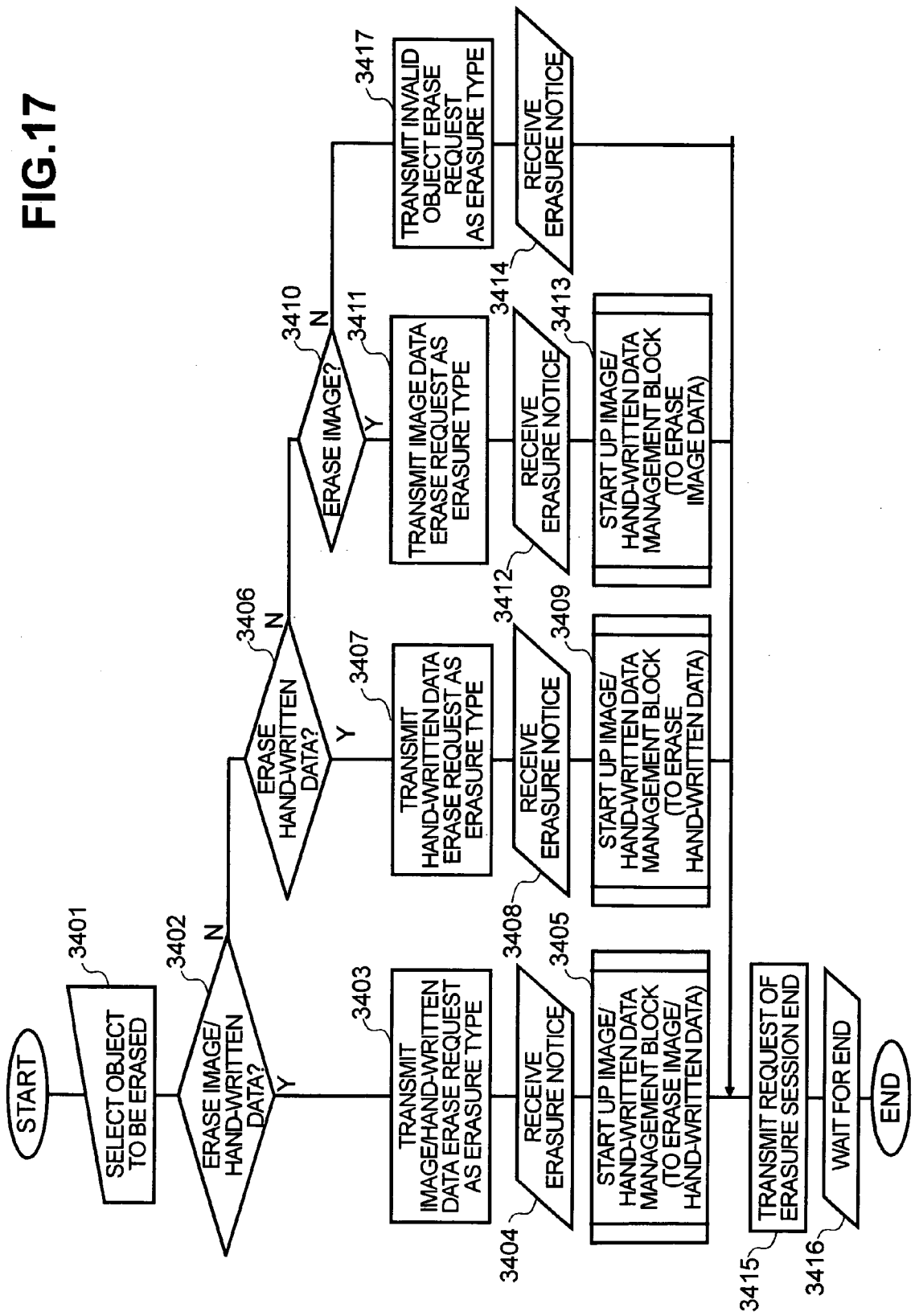
FIG. 17 is a flowchart of the processings of an erasing/information transmission block provided in the terminal unit of the communication system in the embodiment of the present invention.

Next, a description will be made for the processings of the erasing/information transmission block 0314 started up and ended by the session control block 0302 and executed under the CPU during the while with reference to FIG. 17. FIG. 17 shows a flowchart of the processings of the erasing/information transmission block 0314. The erasing/information transmission block 0314 is configured as a task separately from those of other software components and executed by the central processing unit (UNIT) in parallel to the tasks of those other software components.

As shown in FIG. 17, the erasing/information transmission block 0314, when it is started up, displays the erasure content selection screen 0700 for prompting the user to erase only the handwritten data, only the image data, or both of the handwritten data and the image data displayed in the handwritten data input/display area 0404 of the display device, then waits for the user's specification of the object to be erased (step 3401).

The erasing/information transmission block 0314 then determines whether or not the user has specified erasure of both image data and handwritten data (step 3402).

If the determination result is YES (specified), the erasing/information transmission block 0314 transmits a request of image/handwritten data erasure to the remote terminal unit through the communication control/input/output device and the network (step 3403).

After that, the erasing/information transmission block 0314 receives a notice denoting completion of the erasure from the remote terminal unit (step 3404), then starts up the image/handwritten data management block 0316 to instruct the block 0316 to erase both of the image data and the handwritten data from the handwritten data input/display area 0404 of the display device (step 3405).

On the other hand, if the determination result in step 3402 is NO (not specified), the erasing/information transmission block 0314 further determines whether or not the user has specified erasure of only the handwritten data (step 3406). If the determination result is YES, the erasing/information transmission block 0314 transmits a request of handwritten data erasure to the remote terminal unit as an erasure type (step 3407). The erasing/information transmission block 0314, when receiving the notice denoting completion of the erasure from the remote terminal (step 3408), starts up the image/handwritten data management block 0316 and instructs the block 0316 to erase only the handwritten data from the handwritten data input/display area 0404 of the display device (step 3409).

On the other hand, if the determination result in step 3406 is NO (not specified), the erasing/information transmission block 0314 further determines whether or not the user has specified erasure of only the image data (step 3410). If the determination result is YES, the erasing/information transmission block 0314 transmits a request of image data erasure to the remote terminal unit as an erasure type (step 3411). The erasing/information transmission block 0314, when receiving the notice denoting completion of the erasure from the remote terminal (step 3412), starts up the image/handwritten data management block 0316 and instructs the block 0316 to erase only the image data from the handwritten data input/display area 0404 of the display device (step 3413).

On the other hand, if the determination result in step 3410 is NO (not specified), the erasing/information transmission block 0314 determines that the erasure is suspended by the user. The erasing/information transmission block 0314 thus transmits a request of invalid object erasure to the remote terminal unit as an erasure type (step 3417), then receives a notice of erasure from the remote terminal unit (step 3414).

The erasing/information transmission block 0314 then requests the session control block 0302 of the self terminal unit to end the erasure session (step 3415). Instead of this erasure session ending request, the block 0314 may issue an event denoting a request for ending the erasure session to, for example, the session control block 0302.

After that, the erasing/information transmission block 0314 waits (step 3416), then its processing is ended by the session control block 0302.

Figure 18:
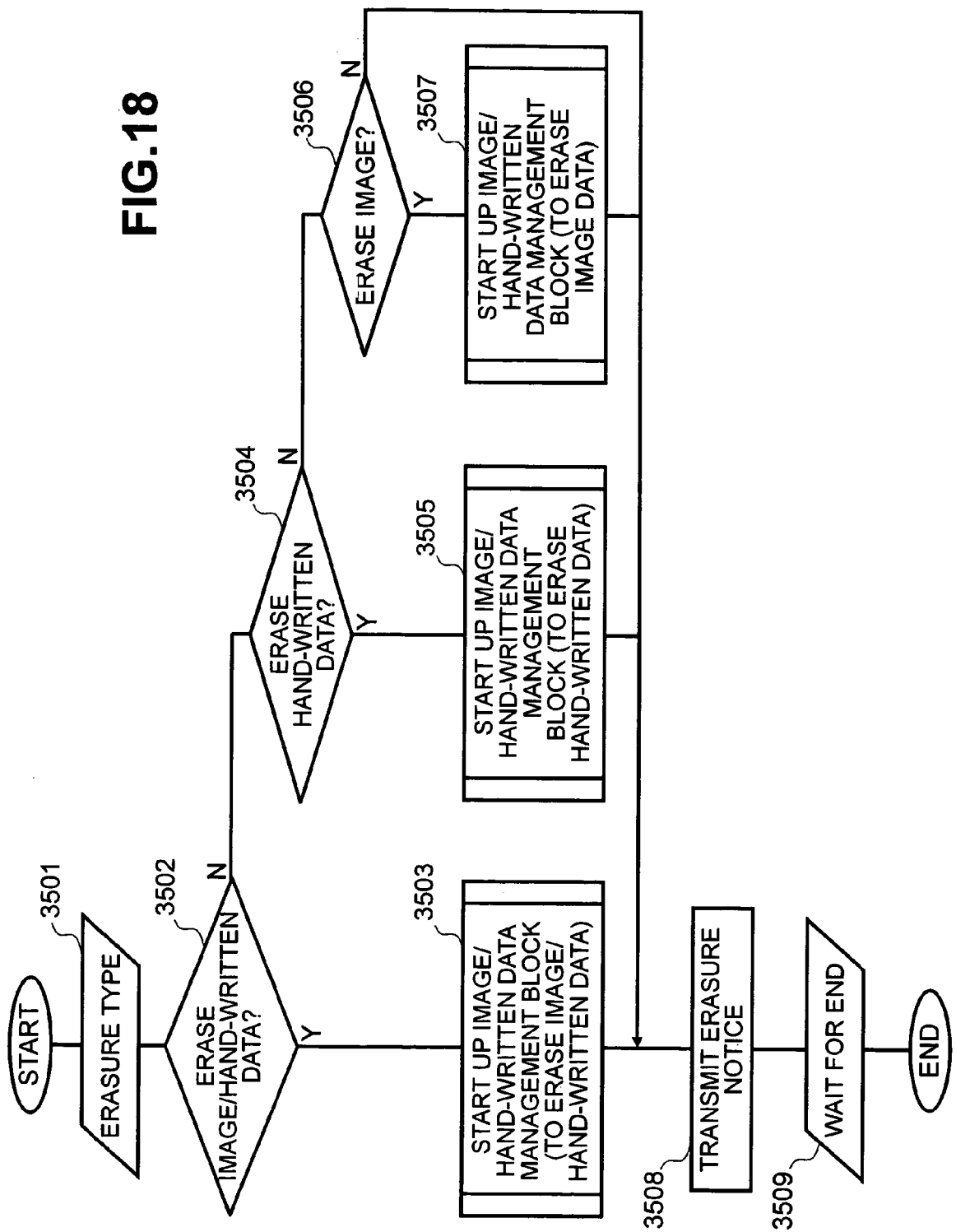
FIG. 18 is a flowchart of the processings of an erasing/information receiving block provided in the terminal unit of the communication system in the embodiment of the present invention.

Next, a description will be made for the processings of the erasing/information receiving block 0315 started up and ended by the session control block 0302 and executed under the control of the CPU during the while with reference to FIG. 18. FIG. 18 shows a flowchart of the processings of the erasing/information receiving block 0315. The erasing/information receiving block 0315 is configured as a task separately from those of other software components and executed by the central processing unit (UNIT) in parallel to the tasks of those other software components.

As shown in FIG. 18, the erasing/information receiving block 0315, when it is started up, receives an erasure type as a request of image/handwritten data erasure, handwritten erasure, image erasure, or invalid object erasure (step 3501).

The erasing/information receiving block 0315 then determines whether or not the erasure type received in step 3501 is erasure of both image data and handwritten data (step 3502).

If the determination result in step 3502 is YES (both), the erasing/information receiving block 0315 starts up the image/handwritten data management block 0316 and instructs the block 0316 to erase both of the image data and the handwritten data from the handwritten data input/display area 0404 of the display device (step 3503).

On the other hand, if the determination result in step 3502 is NO (not both), the erasing/information receiving block 0315 further determines whether or not the received erasure type denotes erasure of only the handwritten data (step 3504). If the determination result is YES (only the handwritten data), the erasing/information receiving block 0315 starts up the image/handwritten data management block 0316 and instructs the block 0316 to erase only the handwritten data from the handwritten data input/display area 0404 of the display device (step 3505).

However, if the determination result in step 3505 is NO (not only the handwritten data), the erasing/information receiving block 0315 further determines whether or not the received erasure type denotes only the image data (step 3506). If the determination result is YES, the erasing/information receiving block 0315 starts up the image/handwritten data management block 0316 and instructs the block 0316 to erase only the image data from the handwritten data input/display area 0404 of the display device (step 3507).

On the other hand, if the determination result in step 3406 is NO (not only the image data), the erasing/information receiving block 0315 determines that the erasure is suspended by the user, so that the erasing/information receiving block 0315 goes to step 3508 without executing no erasure-related processing.

The erasing/information receiving block 0315 then transmits a notice of completion of the erasure to the remote terminal unit (step 3508). After that, the erasing/information receiving block 0315 waits (step 3509), then its processing is ended by the session control block 0302.

Figure 19:
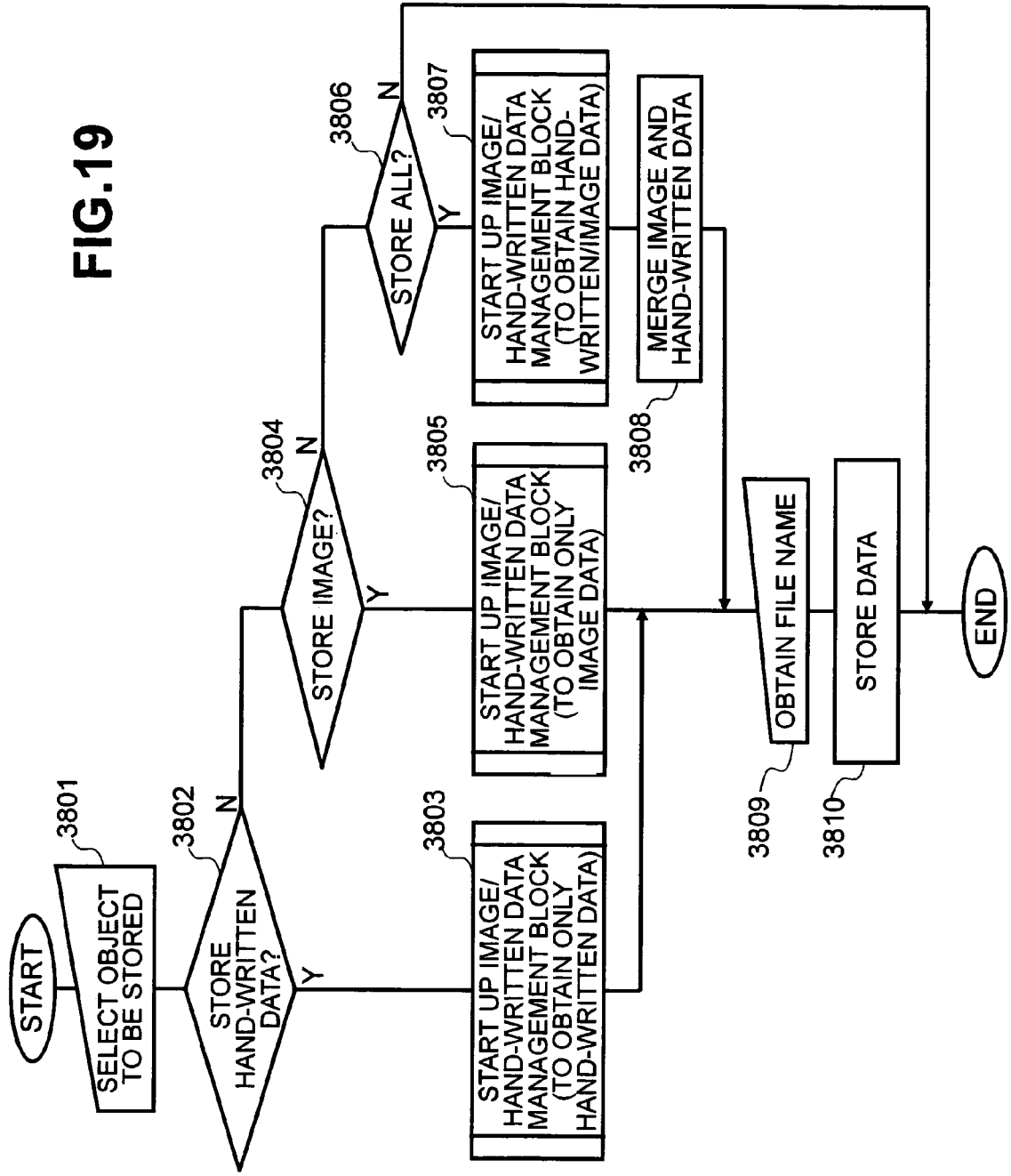
FIG. 19 is a flowchart of the processings of a storing block provided in the terminal unit of the communication system in the embodiment of the present invention.

Next, a description will be made for the processings of the storing block 0318 started up and ended by the input processing block 0301 and executed under the control of the CPU during the while with reference to FIG. 19. FIG. 19 shows a flowchart of the processings of the storing block 0318. The storing block 0318 is configured as a task separately from those of other software components and executed by the central processing unit (UNIT) in parallel to the tasks of those other software components.

As shown in FIG. 19, the storing block 0318, when it is started up, displays the storing data selection screen 0800 for prompting the user to select storing of only the handwritten data, only the image data, or merging both of the handwritten data and the image data displayed in the handwritten data input/display area 0404 of the display device to store the merged data, then waits for the user's specification of the object to be stored (step 3801).

The storing block 0318 then determines whether or not the user has specified storing of only the handwritten data (step 3802). If the determination result is YES (specified), the storing block 0318 starts up the image/handwritten data management block 0316 and instructs the block 0316 to obtain the handwritten data displayed in the handwritten data input/display area 0404 of the display device (step 3803).

On the other hand, if the determination result in step 3802 is NO (not specified), the storing block 0318 further determines whether or not the user has specified storing of only the image data (step 3804). If the determination result is YES (specified), the storing block 0318 starts up the image/handwritten data management block 0316 and instructs the block 0316 to obtain the image data displayed in the handwritten data input/display area 0404 of the display device (step 3805).

On the other hand, if the determination result in step 3804 is NO (not specified), the storing block 0318 determines whether or not the user has specified storing of both of image data and handwritten data (step 3806). If the determination result is YES, the storing block 0318 starts up the image/handwritten data management block 0316 and instructs the block 0316 to obtain both of the image data and the handwritten data displayed in the handwritten data input/display area 0404 of the display device (step 3807), then merges the image data and the handwritten data (step 3808).

The storing block 0318 then obtains the file name inputted by the user through the setting data input device (step 3809) and stores the file name in the primary or secondary storage device (step 3810), then ends its processing.

Figure 20:
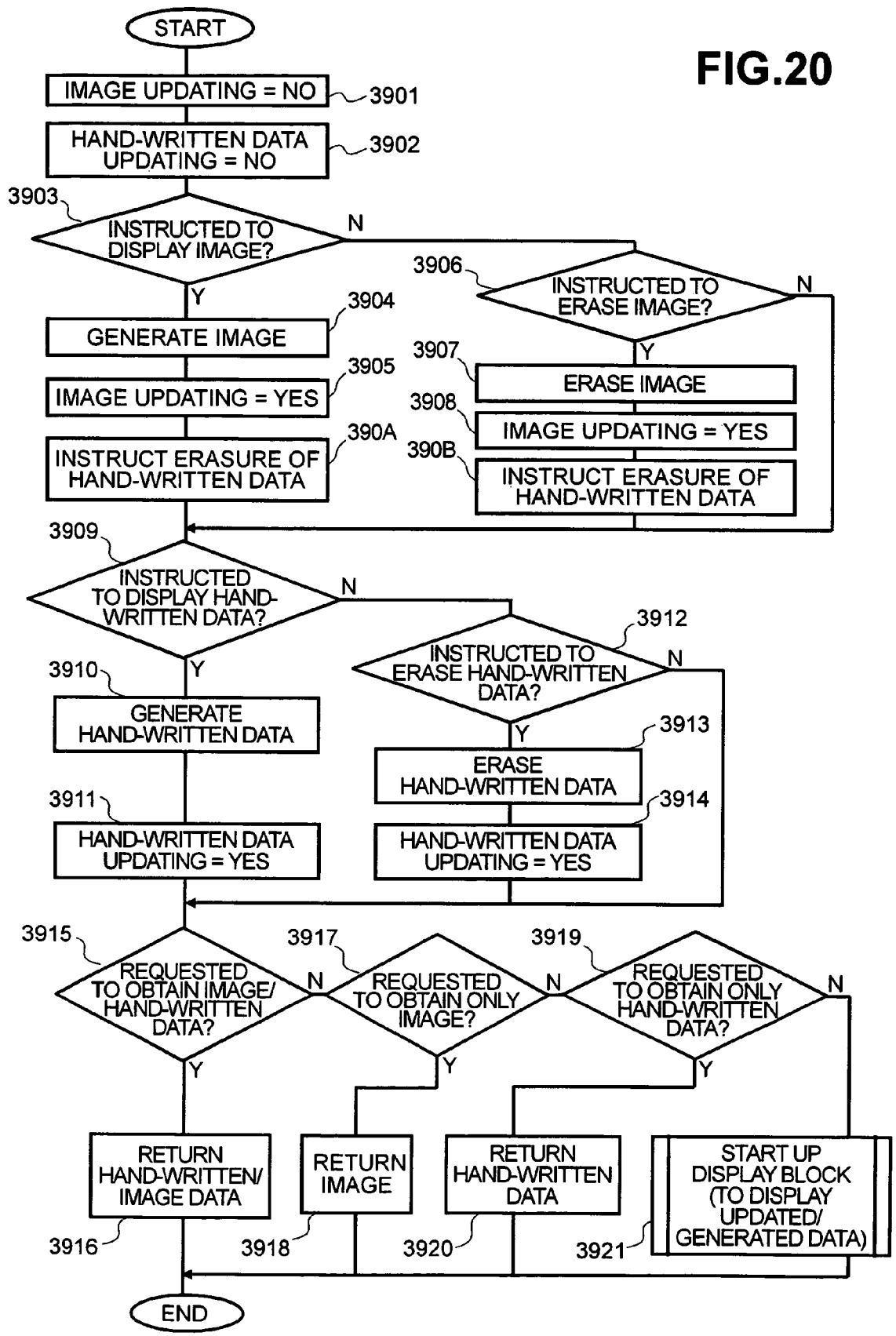
FIG. 20 is a flowchart of the processings of an image/handwritten data management block provided in the terminal unit of the communication system in the embodiment of the present invention.

Next, a description will be made for the processings of the image/handwritten data management block 0316 started-up and ended by one of the file name transmission block 0306, the file content transmission block 0307, the file name receiving block 0309, the file content receiving block 0310, the fast mode handwritten data communication block 0312, the accurate mode handwritten data communication block 0313, the erasing/information transmission block 0314, the erasing/information receiving block 0315, and the storing block 0318 and executed under the control of the CPU during the while with reference to FIG. 20. FIG. 20 shows a flowchart of the processings of the image/handwritten data management block 0316.

As shown in FIG. 20, the image/handwritten data management block 0316, when it is started up, sets itself in a state in which none of image data and handwritten data is updated (steps 3901 and 3902).

The image/handwritten data management block 0316 then determines whether or not it is started up and instructed by any device to display image data (step 3903). If the determination result is YES (started up), the image/handwritten data management block 0316 generates the specified image data on the image plane (to be described later) (step 3904) and updates the image (step 3905), then instructs itself to erase the handwritten data (step 390A) and goes to step 3909.

On the other hand, if the determination result in step 3903 is NO (not started up), the image/handwritten data management block 0316 further determines whether or not it is started up and instructed to erase any image (step 3906). And, if the determination result is YES (started up), the image/handwritten data management block 0316 erases the specified image from the image plane (step 3907) and updates the image (step 3908), then instructs itself to erase the handwritten data from the screen (step 390B) and goes to step 3909).

After that, the image/handwritten data management block 0316 determines whether or not it is started up and instructed to display handwritten data in step 3909. If the determination result is YES (started up so) generates the specified handwritten data in the hand-writing plane (to be described later) (step 3910), then updates the handwritten data (step 3911) and goes to step 3915.

On the other hand, if the determination result is NO (not started up so), the image/handwritten data management block 0316 further determines whether or not it is started up and instructed to erase handwritten data or it has instructed a device to erase handwritten data in step 390A or 390B (step 3912). If the determination result is YES (started up so), the image/handwritten data management block 0316 erases the specified handwritten data from the hand-writing plane (to be described later) (step 3913) and updates the handwritten data (step 3914). Then, the image/handwritten data management block 0316 goes to step 3915.

After that, the image/handwritten data management block 0316 determines whether or not it is started up and instructed to obtain both image data and handwritten data (step 3915). If the determination result is YES (started up so), the image/handwritten data management block 0316 returns the image data generated on the image plane (to be described later) and the handwritten data generated on the handwritten data plane (to be described later) to the processing block that has started up the image/handwritten data management block 0316 (step 3916). After that, the image/handwritten data management block 0316 ends its processing.

On the other hand, if the determination result in step 3915 is NO (not started up so), the image/handwritten data management block 0316 further determines whether or not it is started up and instructed to obtain only image data (step 3917). If the determination result is YES (started up so), the image/handwritten data management block 0316 returns the image data generated in the image data plane (to be described later) to the processing block that has started up the image/handwritten data management block 0316 (step 3918). After that, the image/handwritten data management block 0316 ends its processing.

On the other hand, if the determination result in step 3917 is NO (not started up so), the image/handwritten data management block 0316 further determines whether or not it is started up and instructed to obtain only handwritten data (step 3919). If the determination result is YES (started up so), the image/handwritten data management block 0316 returns the handwritten data generated on the handwritten data plane (to be described later) to the processing block that has started up the image/handwritten data management block 0316 (step 3920). After that, the image/handwritten data management block 0316 ends its processing.

On the other hand, if the determination result is NO (not started up so), the image/handwritten data management block 0316 starts up the display control block 0317 and instructs the block 0317 to display information of whether or not both image data and handwritten data are updated, and the coordinates of the updated handwritten data if the data is updated, as well as the image data generated on the image plane and the handwritten data generated on the handwritten data plane (step 3921). The image/handwritten data management block 0316 then ends its own processing.

Next, how the image/handwritten data management block 0316 manages image data and handwritten data will be described with reference to FIG. 21.

Figure 21:
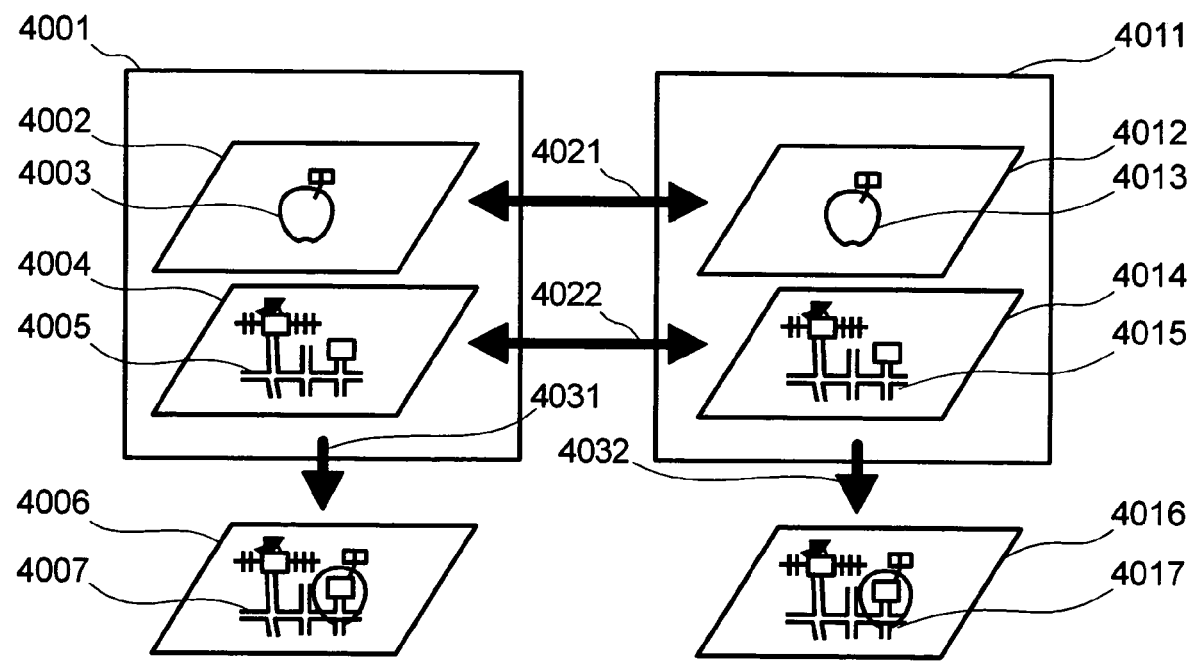
FIG. 21 is an illustration for describing a method for managing image data and handwritten data, employed for the image/handwritten data management block provided in each of two terminal units that are communicating with each other in the embodiment of the present invention.

FIG. 21 is an illustration for describing how the image/handwritten data management block 0316 manages image data and handwritten data in each of the two terminal units that are communicating with each other.

In FIG. 21, reference numerals are defines as follows; 4001 denotes a management process for both image data and handwritten data in one terminal unit A while 4011 denotes a management process for both image data and handwritten data in the other terminal unit B, 4002 denotes a handwritten data plane of the terminal unit A, 4012 denotes a handwritten data plane of the terminal unit B, 4003 denotes handwritten data generated on the handwritten data plane of the terminal unit A, 4013 denotes handwritten data generated on the handwritten data plane of the terminal unit B, 4004 denotes an image data plane of the terminal unit A, 4014 denotes an image data plane of the terminal unit B, 4005 denotes image data generated in the image data plane of the terminal unit A, 4015 denotes image data generated in the image data plane of the terminal unit B, 4021 denotes a handwritten data transmission/receiving process, and 4022 denotes an image data transmission/receiving process.

Other reference numerals are defined as follows; 4006 denotes a merging plane of the terminal unit A while 4016 denotes a merging plane of the terminal unit B, 4007 denotes data generated on the merging plane of the terminal unit A and to be displayed, 4617 denotes data generated in a merging plane of the terminal unit B and to be displayed, 4031 denotes a process for merging handwritten data and image data in the terminal unit A, and 4032 denotes a process for merging handwritten data and image data in the terminal unit B. Those management and processing processes are executed in the storing block 0318 and the display control block 0317 as to be described later.

As shown in FIG. 21, the image/handwritten data management block 0316 manages handwritten data 4003 or 4013 and image data 4005 or 4015 on the handwritten data plane 4002 or 4012 and image data plane 4004 or 4014 separately. Consequently, the display control block 0317 to be described later merges the handwritten data 4003 or 4013 generated on the handwritten data plane and the image data 4005 or 4015 generated in the image data plane to generate the data to be displayed 4007 or 4017 on the merging plane 4006 or 4016 and display the data 4007 or 4017 in the handwritten data input/display area 0404 of the display device. The image/handwritten data management block 0316, when having transmitted/received image data, may clear the hand-writing plane to erase the handwritten data therefrom. When having transmitted/received image data, the image/handwritten data management block 0316 may adjust the sizes of both image plane and hand-writing plane to the size of the image. In this connection, however, if the size of the image is smaller than the handwritten data input/display area 0404 of the display device, the sizes of both image plane and hand-writing plane may be adjusted to the size of the handwritten data input/display area 0404.

As shown in FIG. 21, the image/handwritten data management block 0316 has a plurality of planes and displays the basic image data in one of the planes and handwritten data that is currently communicated on another plane. The image/handwritten data management block 0316 then put those planes in layers to display the data in those planes so as to be overlapped, thereby the basic image is prevented from missing during and after the communication. In other words, this configuration of the image/handwritten data management block 0316 disables the image plane from being edited as a base one and enables only the handwritten data in each hand-writing plane to be edited. In addition, the image/handwritten data management block 0316 can erase part of the handwritten data in a hand-writing plane or part of the image on the image plane. The image/handwritten data management block 0316 can also store only handwritten data and only image data, as well as merges handwritten data and image data and store the merged data. The image/handwritten data management block 0316 can also erase only handwritten data or only image data, or both of them. When the display control block 0317 displays handwritten data and/or image data in the handwritten data input/display area 0404 of the display device, the management block 0316 can select either the handwritten data generated in the hand-writing plane or the image data generated on the image plane to generate the data to be displayed, on the merging plane, thereby displaying only the handwritten data or only the image data.

Figure 22:
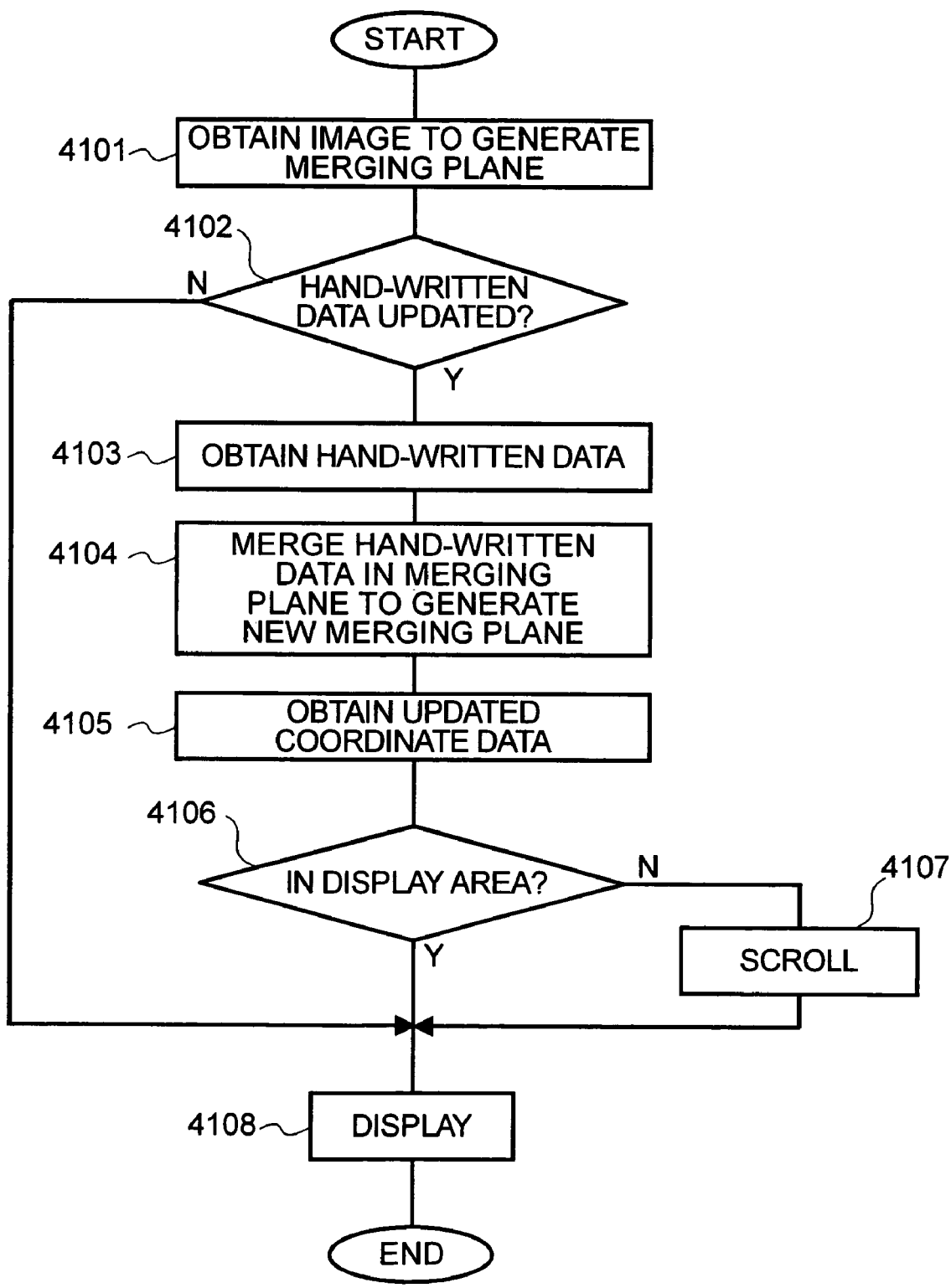
FIG. 22 is a flowchart of the processings of a display control block provided in the terminal unit of the communication system in the embodiment of the present invention.

Next, a description will be made for the processings of the display control block 0317 started and ended by the image/handwritten data management block 0316 and executed under the control of the CPU during the while with reference to FIG. 22. FIG. 22 shows a flowchart of the processings of the display control block 0317.

As shown in FIG. 22, the display control block 0317, when it is started up by the image/handwritten data management block 0316, obtains the image generated on the image plane to generate a merging plane (step 4101). If there is no image generated on the image plane, the display control block 0317 may generate a merging plane from a solid color image.

After that, the display control block 0317 determines whether or not handwritten data is updated according to whether or not both image data and handwritten data notified thereto when it is started up (step 4102). If the determination result is NO (not updated), the display control block 0317 displays the image generated on the merging plane in the handwritten data input/display area 0404 of the display device (step 4108) and ends its processing.

On the other hand, if the determination result in step 4102 is YES (updated), the display control block 0317 obtains the handwritten data generated on the hand-writing plane (step 4103) to merge the handwritten data on the merging plane to generate a new merging plane (step 4104).

The display control block 0317 then obtains the coordinate data of the updated handwritten data to be notified when it is started up (step 4105), then determines whether or not this coordinate data is of the display area, that is, in the handwritten data input/display area 0404 (step 4106).

If the determination result is YES (that of the display area), the display control block 0317 displays both image data and handwritten data generated newly on the merging plane in step 4104 in the handwritten data input/display area 0404 of the display device (step 4108), then ends its processing.

On the other hand, if the determination result is NO (not that of the display area), the display control block 0317 scrolls both image data and handwritten data generated on the merging plane in step 4104 (step 4107) so as to display the merged data in the handwritten data input/display area 0404 of the display device (step 4108) so that the coordinates of the updated handwritten data of the image and handwritten data generated newly on the merging plane in step 4104 is displayed in the display area, that is, in the handwritten data input/display area 0404. The display control block 0317 then ends its processing.

Next, how the display control block 0317 displays image data and handwritten data will be described with reference to FIG. 23.

Figure 23:
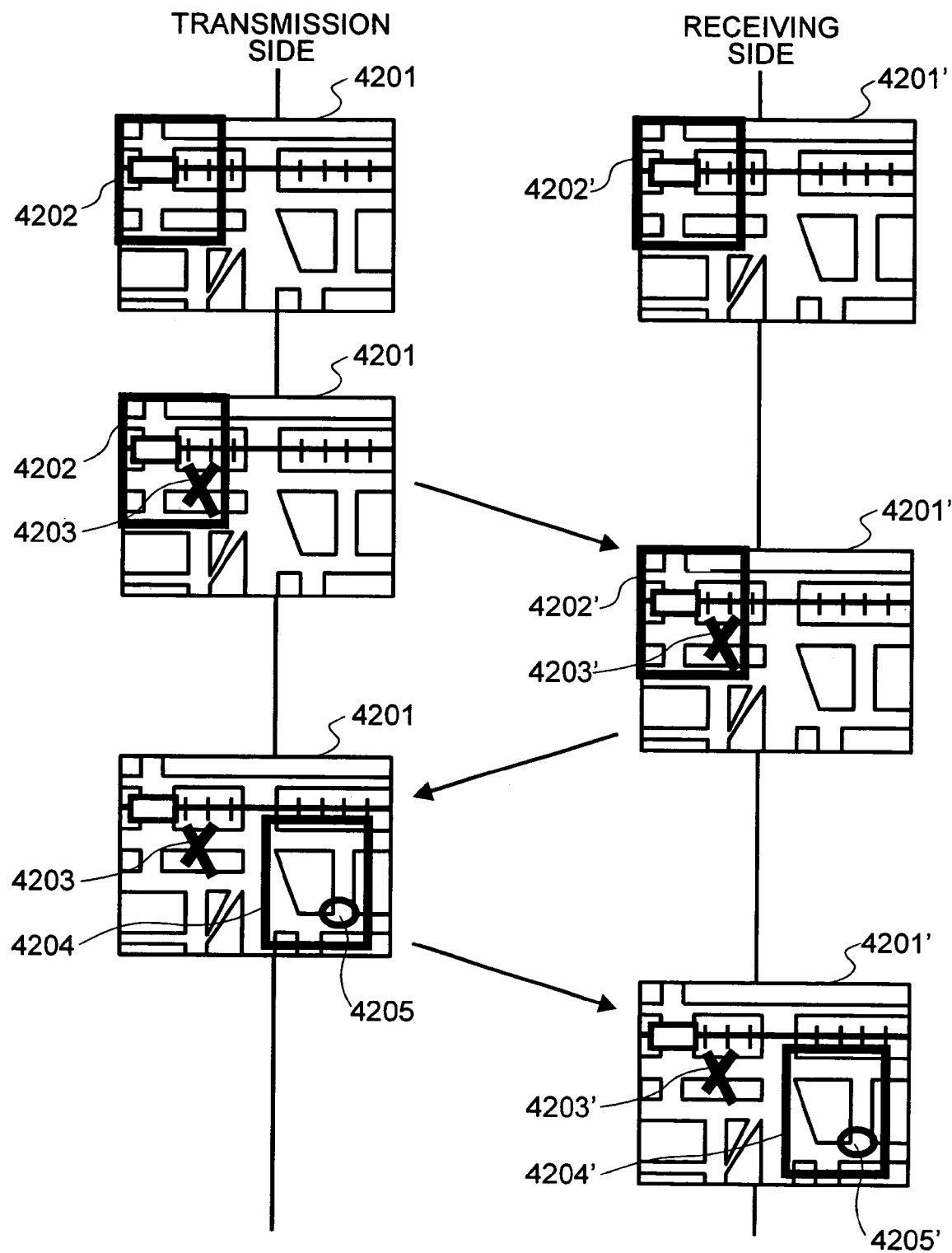
FIG. 23 is an illustration for describing how image data and handwritten data are displayed by the display control block provided in the terminal unit of the communication system in the embodiment of the present invention.

In FIG. 23, one of the two terminal units provided with this display control block 0317 respectively has transmitted image data to the other terminal unit and the image data is thus displayed on the display devices of both terminal units. In such a state, handwritten data is being transmitted from one terminal unit to the other.

In FIG. 23, reference numerals are defined as follows; 4201 and 4201' denote an image to be displayed in the handwritten data transmission side terminal unit and another image to be displayed in the handwritten data receiving side terminal unit, 4202 and 4204, as well as 4202' and 4204' denote an image displayed in the handwritten data input/display area 0404 of the handwritten data transmission side terminal unit and another image displayed in the handwritten data input/display area 0404 of the handwritten data receiving side terminal unit. Furthermore, in FIG. 23, 4203 and 4205, as well as 4203' and 4205' denote handwritten data inputted to/transmitted from/ displayed in the handwritten data transmission side terminal unit and handwritten data received/displayed at the handwritten data receiving side terminal unit.

As shown in FIG. 23, in a terminal unit provided with this display control block 0317, if handwritten data is inputted/ transmitted/displayed from the handwritten data transmission side terminal unit while the image 4202 is displayed in the handwritten data input/display area 0404 of the display device at the handwritten data transmission side terminal unit and the image 4202' is displayed in the handwritten data input/display area 0404 of the display device at the handwritten data receiving side terminal unit, then the handwritten data is also displayed on the display unit of the receiving side terminal unit without scrolling the image and the handwritten data generated on the merging plane, since the handwritten data is to be positioned in the handwritten data input/display area 0404 of the display device of the receiving side terminal unit.

Meanwhile, let us assume that handwritten data 4205 is inputted/transmitted/displayed from the handwritten data transmission side terminal unit in two cases: an image displayed in the handwritten data input/display area 0404 of the display unit at the transmission side is scrolled, thereby the image 4204 comes to be displayed; and an image 4202' is displayed in the area 0404 of the display unit at receiving side. Both image and handwritten data generated on the merging plane are scrolled automatically so as to display the image 4204' in the area 0404. The handwritten data 4205' is thus displayed in the area 0404 of the display unit at the receiving side, as well. This is because this handwritten data goes out of the area 0404 at the receiving side terminal unit.

Consequently, it is prevented that handwritten data is inputted concurrently from the two terminal units communicating with each other and handwritten data inputted from one of the two terminal units is always displayed at both terminal units due to the processings of the display control block 0317, the fast mode handwritten data communication block 0312, and the accurate mode handwritten data communication block 0313 described above. The communication between the two terminal units is thus smoothed. In other words, the coordinate systems of basic image data and handwritten data are prepared and each position pointed by handwritten data is interchanged between those terminal units, so that if a position pointed by handwritten data is not to be displayed on the display devices of both terminal units, the basic image data and handwritten data are scrolled so as to be displayed, thereby important information in handwritten data communication is displayed without fail.

This advantage becomes more apparent during communication between terminal units having different resolutions in their handwritten data input/display areas 0404. Therefore, next, a description will be made for how this display control block 0317 displays both image data and handwritten data on the display devices of two terminal units having different resolutions in their handwritten data input/display area 0404 with reference to FIG. 24.

Figure 24:
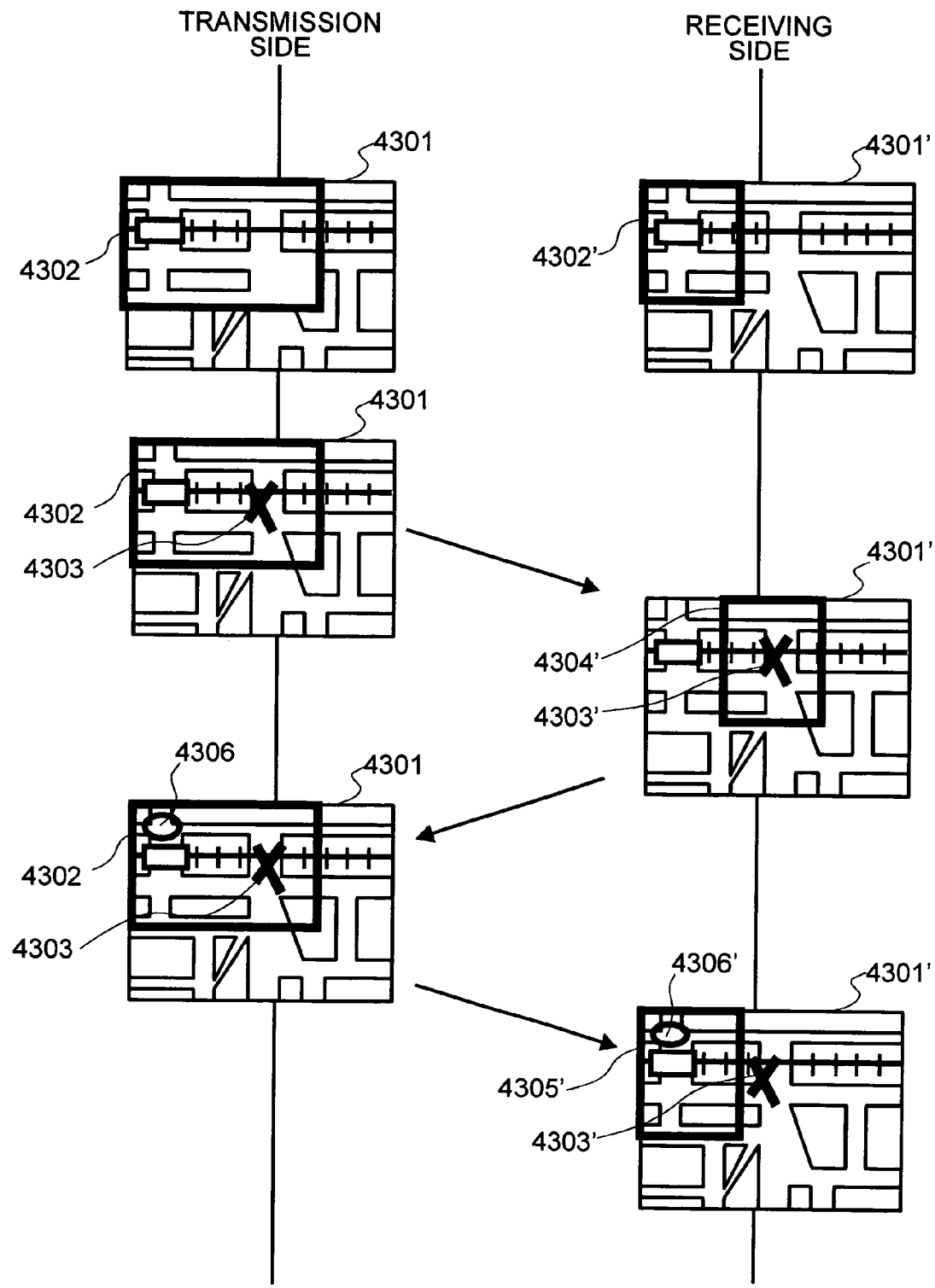
FIG. 24 is an illustration for describing how image data and handwritten data are displayed by the display control block provided in the terminal unit of the communication system in the embodiment of the present invention, particularly during communications between two terminal units having different resolutions in their handwritten data input/display areas.

FIG. 24 shows a case in which image data is already transmitted from one of two terminal units provided with this display control block 0317 respectively and having different resolutions in their handwritten data input/display areas 0404 and this image data is displayed on the display devices of the two terminal units. In this state, handwritten data is being transmitted from one terminal unit to the other.

In FIG. 24, reference numerals are defined as follows; 4301 and 4301' denote images to be displayed on the display devices of terminal units at both handwritten data transmission and receiving sides while 4302, 4302', 4304', and 4305' denote images displayed in the handwritten data input/display areas 0404 at both handwritten data transmission and receiving sides. Also in FIG. 24, 4303 and 4306, as well as 4303' and 4306' denote handwritten data inputted to/transmitted from/displayed at the handwritten data transmission side terminal unit and handwritten data received/displayed at the handwritten data receiving side terminal unit.

As shown in FIG. 24, in a terminal unit provided with this display control block 0317, if handwritten data is inputted/ transmitted/displayed from the transmitting side terminal unit while an image 4302 is displayed in the handwritten data input/display area 0404 of the transmission side terminal unit and an image 4302' is displayed in the handwritten data input/ display area 0404 of the receiving side terminal unit, then this handwritten data comes to be displayed out of the area 0404 at the receiving side. Thus, the receiving side terminal unit scrolls both image data and handwritten data generated on the merging plane automatically to display the image 4304' in the area 0404, thereby the handwritten data 4303' is also displayed at the receiving side.

Furthermore, if handwritten data 4306 is inputted/transmitted/displayed from the handwritten data transmitting side terminal unit while an image 4302 is displayed in the area 0404 of the transmission side terminal unit and an image 4304' is displayed in the area 0404 of the handwritten data receiving side terminal unit, this handwritten data also goes out of the handwritten data input/display area 0404 at the receiving side. The receiving side terminal unit thus scrolls both image and handwritten data generated on the merging plane automatically to display the image 4305' in the area 0404, thereby the handwritten data 4306' comes to be displayed at the receiving side.

Figure 25:
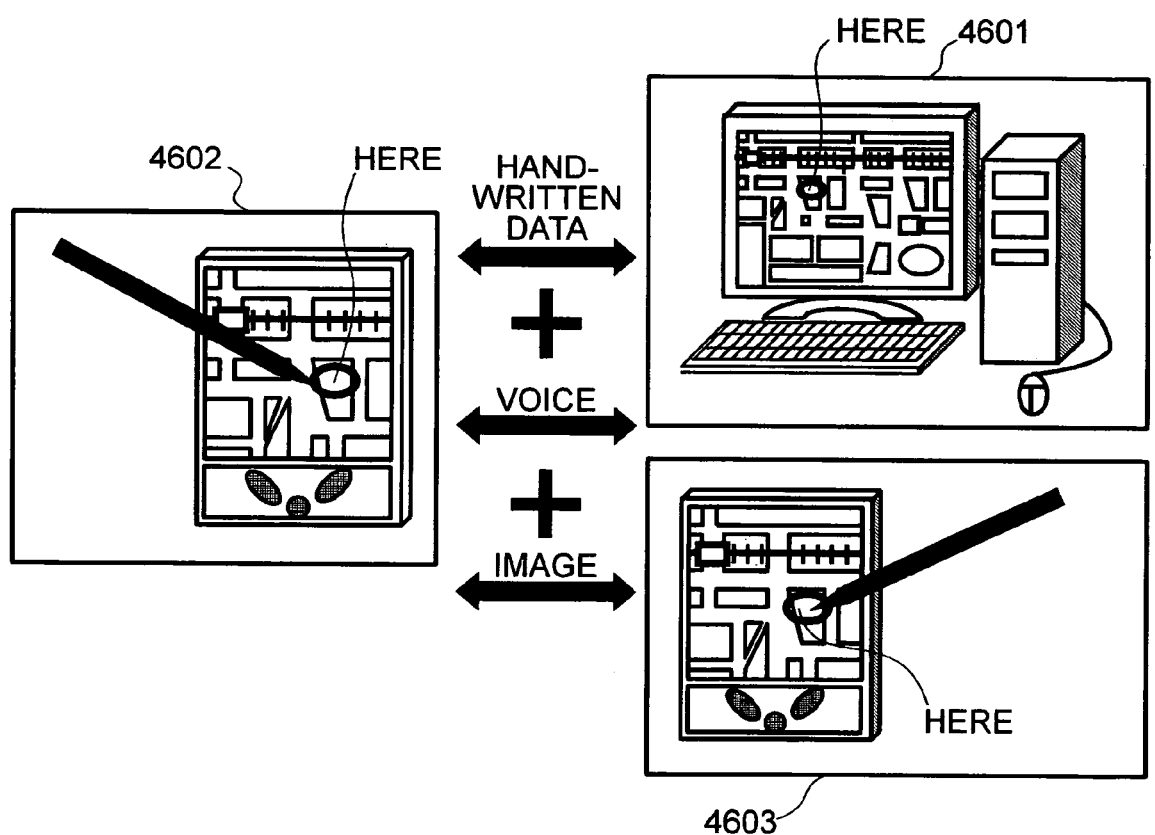
FIG. 25 is an illustration for describing the features of the communication system in the embodiment of the present invention.

While the embodiment of the present invention has been described, according to the present invention, as shown in FIG. 25, voice, image, and handwritten data are used to enable smooth voice communications by pointing to images between such low performance/small display screen terminal units 4602 and 4603 as portable terminal units. Similar smooth voice communications are also possible between such a low performance/small display screen terminal units 4602/4603 as a portable terminal unit and such a terminal unit 4601 as a personal computer provided with a large display screen with use of voice, image, and handwritten data by pointing images.

The order of the determinations and the processings performed according to the results of those determinations in each processing block may be changed as needed; for example, each processing block may be moved before/after any other block or those processing blocks may be arranged in random order. And, although each of the above processings is realized by software in the above embodiment, it may be realized by hardware, of course. Each button described as a user interface in this embodiment may be replaced with a user's instruction inputted with the user's voice to the terminal unit. In this connection, the terminal unit comes to be provided with a voice recognition engine so that the terminal unit, when recognizing a voice, functions just like when a button is pressed.

According to the present invention, therefore, smooth voice communications are possible between terminal units with use of voice, image, and handwritten data by pointing to images.

What is claimed is:

1. A communication system comprising:
    a network; and
    at least two terminal units connected thereto,
    wherein each terminal unit comprises:
        session controlling means for controlling a session for enabling transmission/receiving of voice, image, and handwritten data to/from a remote terminal unit individually;
        display means for displaying said image and said handwritten data,
        wherein said image data and said handwritten data are overlapped and displayed on a display of said display means;
        an image/handwritten data managing means for managing image/handwritten data,
    wherein the image/handwritten data managing means has a plurality of planes,
    wherein the managing means displays basic image data on one of the plurality of planes, the one of the plurality of planes being an image data plane, and displays handwritten data currently handled in communication on a different plane, the different plane being a handwritten data plane, so that image and handwritten data are displayed so as to overlap each other by putting the different planes in layers,
    wherein the session controlling means comprises means for starting and ending voice communication, image communication and handwritten data communication independently, and
    wherein said means for starting and ending voice communication, image communication and handwritten data communication independently is configured to make at least one of the image communication, handwritten data communication, and voice communication at a high quality, and end other communications even when a through-put of the terminal unit or a number of communication bands is insufficient,
    wherein each terminal unit further comprises:
        erasing/information transmitting means for erasing image and handwritten data from the display means through the image/handwritten data managing means and transmitting erasure information to the remote terminal unit,
        wherein in the terminal unit, the erasing/information transmitting means can select either image or handwritten data or both of image and handwritten data as an object to be erased and erase a selected object from the display means; and
        an erasing/information receiving means for erasing image and handwritten data from the display means through the image/handwritten data managing means according to the erasure information from the remote terminal unit,
        wherein in the terminal unit, the erasing/information transmitting means notifies the remote terminal unit of completion of the object erasure in return for the erasure information so that the remote terminal erases the object from its display means according to the notice.

2. The communication system according to claim 1, wherein transmission/receiving of voice data is capable while said image data and/or handwritten data are displayed.

3. The communication system according to claim 1, wherein in the terminal unit, the image/handwritten data managing means, when having transmitted/received image data, adjusts sizes of the image data plane and the handwritten data plane to the size of the transmitted/received image data.

4. The communication system according to claim 1, wherein the terminal unit further comprises:
    storing means for storing data to be processed by the self terminal unit,
    wherein the storing means can select either image or handwritten data or both of image and handwritten data as an object to be stored and stores the selected object in a storage means.

5. The communication system according to claim 1, wherein in the terminal unit said session controlling means, when starting and ending image and/or handwritten data communication, can transmit/receive image and/or handwritten data from/to the remote terminal unit registered beforehand without requiring the permission of the receiving-side user.

6. The communication system according to claim 5, wherein in the terminal unit, the session controlling means, when starting and ending a voice session, receives voice data from the remote terminal unit registered beforehand without requiring permission of the receiving-side user.

7. The communication system according to claim 1, wherein each terminal unit further comprises:
    a handwritten data controlling means for controlling transmission/receiving of handwritten data, wherein said handwritten data controlling means collects a sampled handwritten data in a chunk at the predetermined number of sampling times to transmit/receive the chunk of sampled handwritten data, and wherein in the terminal unit, the handwritten data controlling means denotes whether or not a notice is received at each chunk of data alternately between the two subject terminal units.

8. The communication system according to claim 7, wherein in the terminal unit, the handwritten data controlling means permits editing of handwritten data on the handwritten data plane while the handwritten data controlling means prohibits editing of image data on the image data plane.

9. The communication system according to claim 1, wherein each terminal unit further comprises:

a display controlling means for displaying image and handwritten data on the display means according to instructions received from the image/handwritten data managing means, wherein the display controlling means prepares the coordinate systems for both the basic image data and handwritten data, enables a position pointed by handwritten data to be exchanged between two terminal units, and wherein in the terminal unit, the display controlling means enable to automatically scroll both of the image data and the handwritten data to display both of the data on the display means of the remote terminal unit if the position pointed by the handwritten data might not be displayed on the display means of the one terminal unit.

* * * * *

UNITED STATES PATENT AND TRADEMARK OFFICE
CERTIFICATE OF CORRECTION

PATENT NO. : 7,584,431 B2  Page 1 of 1
APPLICATION NO. : 10/724778
DATED : September 1, 2009
INVENTOR(S) : Kazushige Hiroi et al.

It is certified that error appears in the above-identified patent and that said Letters Patent is hereby corrected as shown below:

ON THE TITLE PAGE:

Please correct Item (12) to read as follows:

(12) United States Patent

~~Kazushige~~ Hiroi et al.

Please correct Item (75) to read as follows:

(75) Inventors: ~~Hiroi Kazushige~~ Kazushige Hiroi, Machida (JP);
Nobukazu Kondo, Ebina (JP); Tsutomu
Hara, Yokohama (JP); Tooru Yokozawa,
Yokohama (JP); Kazuchika Ogiwara,
Fujisawa (JP); Masaya Umemura,
Yokosuka (JP); Shinichiro Okamura,
Yokohama (JP)

Signed and Sealed this

First Day of June, 2010

David J. Kappos
*Director of the United States Patent and Trademark Office*